United States Patent
Scivicque

(10) Patent No.: US 10,778,841 B2
(45) Date of Patent: Sep. 15, 2020

(54) METHOD AND SYSTEM FOR IMPLEMENTING TELEPHONE SOLICITATION PREVENTION

(71) Applicant: CenturyLink Intellectual Property LLC, Broomfield, CO (US)

(72) Inventor: Joseph A. Scivicque, Lafayette, LA (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 13 days.

(21) Appl. No.: 16/425,690

(22) Filed: May 29, 2019

(65) Prior Publication Data
US 2020/0153877 A1    May 14, 2020

Related U.S. Application Data

(60) Provisional application No. 62/760,431, filed on Nov. 13, 2018, provisional application No. 62/777,559, filed on Dec. 10, 2018.

(51) Int. Cl.

| | |
|---|---|
| *H04M 3/436* | (2006.01) |
| *H04M 3/42* | (2006.01) |
| *H04L 29/12* | (2006.01) |
| *H04L 9/30* | (2006.01) |
| *H04L 9/32* | (2006.01) |
| *H04L 29/06* | (2006.01) |

(52) U.S. Cl.
CPC .............. *H04M 3/436* (2013.01); *H04L 9/30* (2013.01); *H04L 9/3268* (2013.01); *H04L 61/605* (2013.01); *H04L 65/1069* (2013.01); *H04L 65/1079* (2013.01); *H04L 65/1096* (2013.01); *H04M 3/42059* (2013.01)

(58) Field of Classification Search
CPC . H04M 3/436; H04M 3/42059; H04L 61/605; H04L 9/30; H04L 9/3268; H04L 65/1069; H04L 65/1079; H04L 65/1096
See application file for complete search history.

(56) References Cited

U.S. PATENT DOCUMENTS

| | | | | |
|---|---|---|---|---|
| 8,681,967 | B1* | 3/2014 | Johnson | H04M 3/4365 379/210.02 |
| 10,104,237 | B1* | 10/2018 | Amin | H04L 65/1016 |
| 10,554,821 | B1* | 2/2020 | Koster | H04L 65/1079 |

(Continued)

*Primary Examiner* — Ajay Cattungal

(57) ABSTRACT

Novel tools and techniques are provided for implementing telephone solicitation prevention using enhanced voice over Internet protocol ("VoIP") functionalities in conjunction with STIR/SHAKEN protocols. In various embodiments, in response to receiving a call setup message or a call request from a calling party, a call server might send a verification request to a secure telephone identity ("STI") verification server ("VS"). The STI-VS might verify and send the call setup message to a no solicitation application server, which might instruct a media server to connect to a first gateway device and to play a no solicitation message requesting a response from the calling party, and which might verify whether the response is an appropriate response. If so, a call is established. If not, the call might be disconnected and/or forwarded to a voicemail server to play a voicemail message to the calling party in accordance with preferences of the called party.

20 Claims, 14 Drawing Sheets

(56) References Cited

U.S. PATENT DOCUMENTS

| | | | |
|---|---|---|---|
| 2012/0136743 A1* | 5/2012 | McQuade | G06Q 30/0283 |
| | | | 705/26.3 |
| 2014/0112459 A1* | 4/2014 | Goulet | H04M 3/436 |
| | | | 379/88.01 |
| 2015/0003600 A1* | 1/2015 | Bucko | H04M 3/436 |
| | | | 379/210.02 |
| 2015/0046214 A1* | 2/2015 | Jain | G06Q 30/0201 |
| | | | 705/7.29 |
| 2016/0006875 A1* | 1/2016 | Burmeister | H04M 3/5158 |
| | | | 379/265.06 |
| 2016/0050316 A1* | 2/2016 | Jain | G06Q 30/02 |
| | | | 379/221.14 |
| 2018/0249005 A1* | 8/2018 | Dowlatkhah | H04W 4/16 |
| 2018/0249006 A1* | 8/2018 | Dowlatkhah | H04W 8/18 |
| 2018/0302513 A1* | 10/2018 | Cohen | H04M 1/663 |
| 2018/0324299 A1* | 11/2018 | Sial | H04W 4/16 |
| 2019/0068657 A1* | 2/2019 | Filart | H04L 65/1079 |
| 2019/0116258 A1* | 4/2019 | Gallagher | H04M 3/2281 |
| 2019/0174000 A1* | 6/2019 | Bharrat | H04M 3/42059 |

* cited by examiner

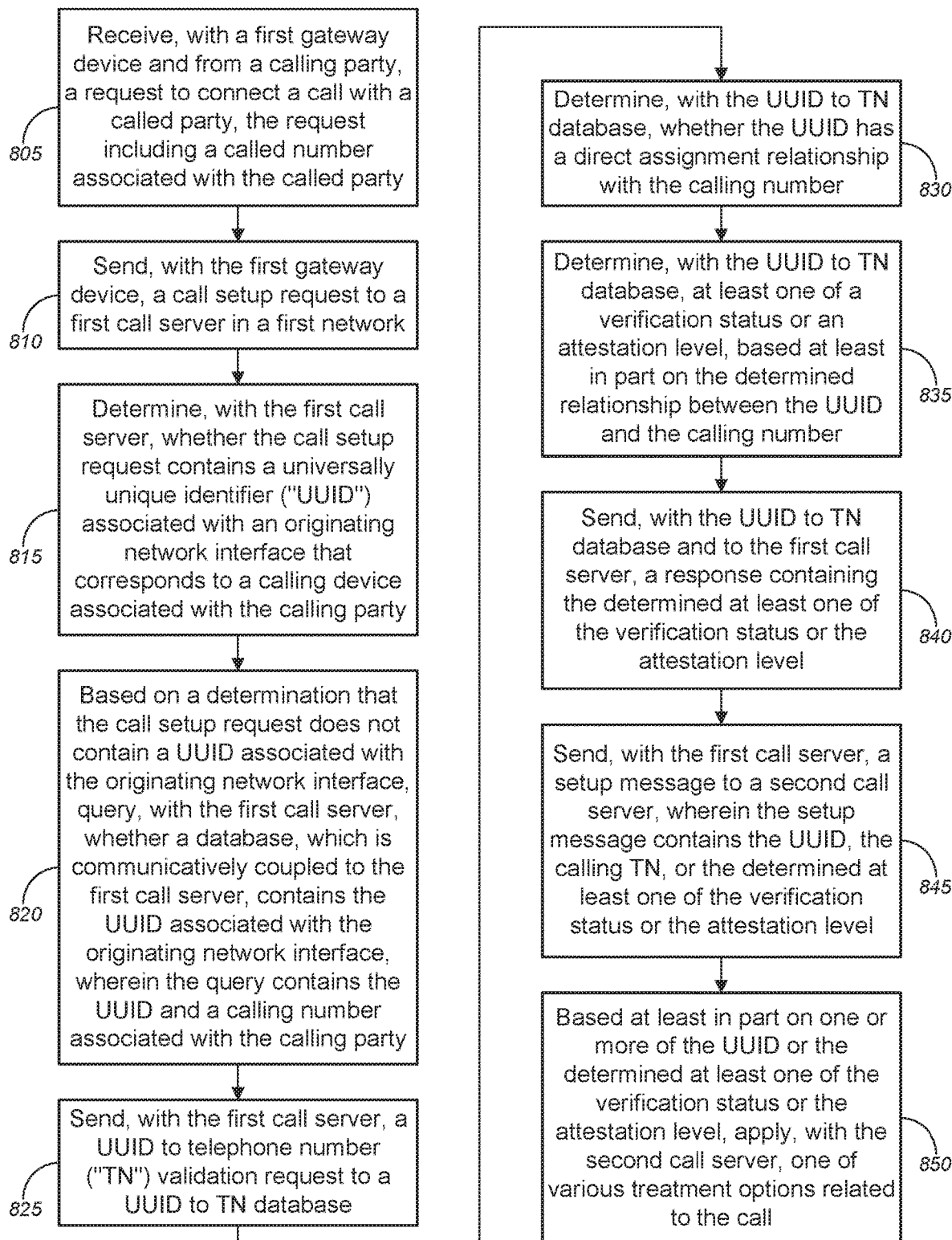

METHOD AND SYSTEM FOR IMPLEMENTING TELEPHONE SOLICITATION PREVENTION

CROSS-REFERENCES TO RELATED APPLICATIONS

This application claims priority to U.S. Patent Application Ser. No. 62/760,431 (the "'431 application"), filed Nov. 13, 2018 by Joseph A. Scivicque, entitled, "Method and System for Implementing Telephone Solicitation Prevention," and U.S. Patent Application Ser. No. 62/777,559 (the "'559 application"), filed Dec. 10, 2018 by Joseph A. Scivicque, entitled, "Method and System for Implementing Telephone Solicitation Prevention," each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing telephone solicitation prevention, and, more particularly, to methods, systems, and apparatuses for implementing telephone solicitation prevention using enhanced voice over Internet protocol ("VoIP") functionalities in conjunction with secure telephone identity revisited ("STIR") secure handling of asserted information using tokens ("SHAKEN") protocols and/or implementing validation of telephone number assignment using a universally unique identifier to telephone number database query.

BACKGROUND

In conventional telephonic systems, it is difficult to avoid or prevent telephone solicitation. In particular, robo-callers or automated calling systems tend to connect with called parties, regardless of the called parties having set options for no call or no solicitation. Although some systems have protocols or procedures in place in attempts to prevent such telephone solicitations, robo-callers and automated calling systems continue to call called parties.

Hence, there is a need for more robust and scalable solutions for implementing telephone solicitation prevention using enhanced voice over Internet protocol ("VoIP") functionalities in conjunction with secure telephone identity revisited ("STIR") secure handling of asserted information using tokens ("SHAKEN") protocols and/or implementing validation of telephone number assignment using a universally unique identifier to telephone number database query.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 8 is a flow diagram illustrating a method for implementing validation of telephone number assignment using a universally unique identifier to telephone number database query, in accordance with various embodiments.

DETAILED DESCRIPTION OF CERTAIN EMBODIMENTS

Overview

Figure 1:
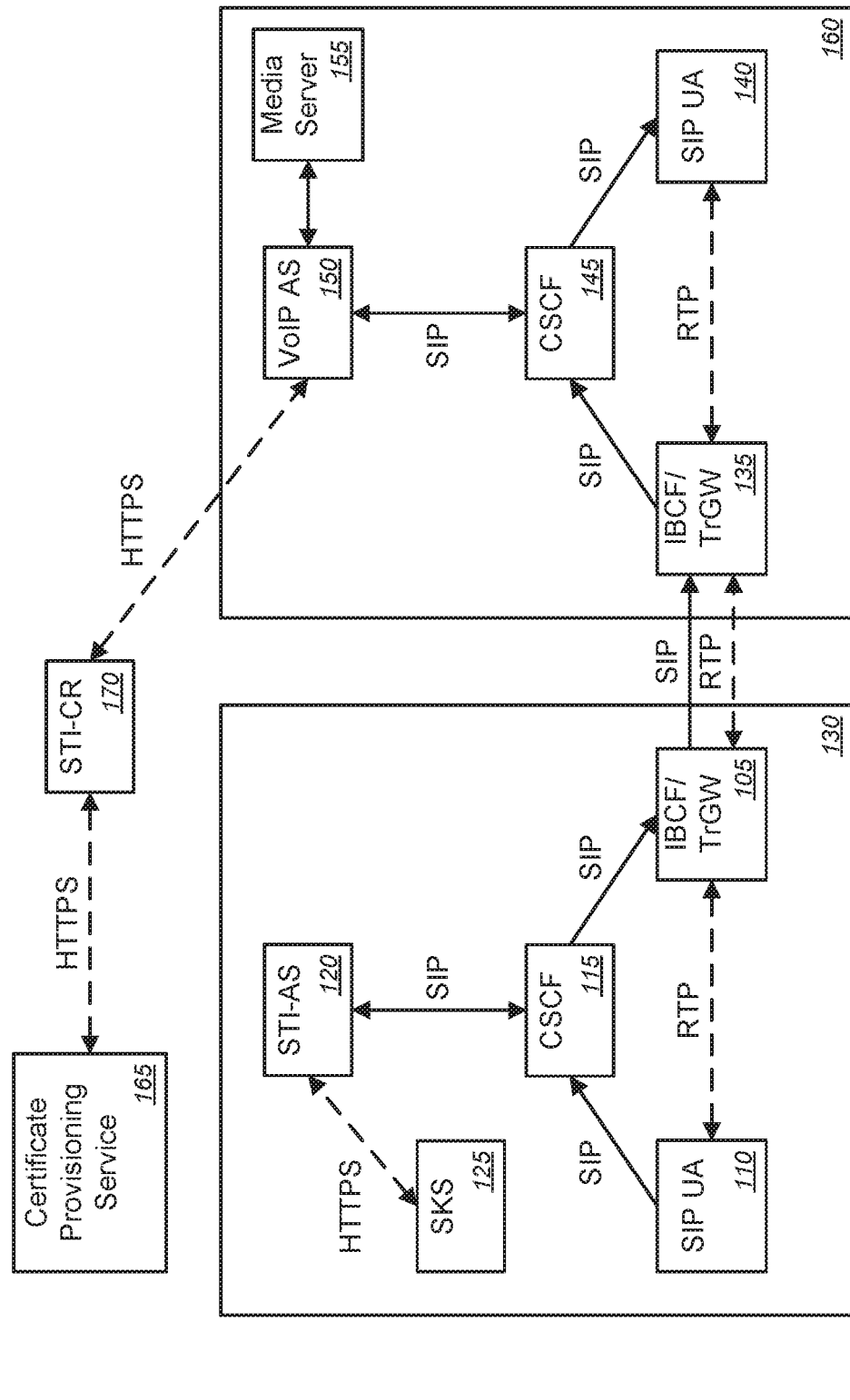
FIG. 1 is a schematic diagram illustrating a system for implementing telephone solicitation prevention using enhanced voice over Internet protocol ("VoIP") functionalities in conjunction with secure telephone identity revisited ("STIR") secure handling of asserted information using tokens ("SHAKEN") protocols, in accordance with various embodiments.

Various embodiments provide tools and techniques for implementing telephone solicitation prevention using enhanced voice over Internet protocol ("VoIP") functionalities in conjunction with secure telephone identity revisited ("STIR") secure handling of asserted information using tokens ("SHAKEN") protocols and/or implementing validation of telephone number assignment using a universally unique identifier to telephone number database query.

In various embodiments, a first gateway device might receive, from a calling party, a request to connect a call with a called party, the request including a called number associated with the called party. The first gateway device might send a call setup request to a first call server in a first network. In response to receiving the call setup request, the first call server might send a call setup message to a second call server in a second network. In response to receiving the call setup message, the second call server might send a verification request to a secure telephone identity ("STI") verification server ("VS"). In response to receiving the verification request, the STI-VS might verify the call setup message, and might send the verified call setup message to a no solicitation application server. In response to receiving the verified call setup, the no solicitation application server might instruct a media server to connect to the first gateway device and to play a no solicitation message requesting a request from the calling party. The media server might return a reply message to the no solicitation application server indicating a connection point for a voice media path to the calling party, might play a prompt to the calling party (the prompt instructing the calling party to respond by performing one or more tasks), receiving a response from the calling party in accordance with at least one of the one or more tasks, and returning the response to the no solicitation application server. The no solicitation application server might verify whether the response is an appropriate response in accordance with at least one of the one or more tasks. Based on a determination that the response has been verified to be an appropriate response, a connected call may be established between the calling party and the called party. Based on a determination that the response is not an appropriate response, either the call may be disconnected or a voicemail message may be played to the calling party in accordance with preferences of the called party (prior to disconnecting the call).

In some embodiments, in response to receiving the call setup request, the first call server might send a signing request (i.e., a request to sign the call setup request) to a STI authentication server ("AS"). In response to receiving the signing request, the STI-AS might query a secure key server ("SKS") for a private key. The STI-AS might set an attestation level for the calling party based on one or more attributes associated with the calling party, might create a signed call setup message using the private key, and might return the signed call setup message to the first call server. In response to receiving the signed call setup message, the first call server might select a route through a plurality of call servers to a second call server in a second network, using the called number, wherein sending the call setup message to the second call server might comprise sending, with the first call server, the call setup message to the second call server via the selected route. According to some embodiments, in response to receiving the verification request, the STI-VS might query a certificate repository for a public key, based on information in the verification request, wherein verifying the call setup message might comprise decrypting and verifying, with the STI-VS, the signed call setup message using the public key.

In some cases, the attestation level for the calling party might comprise one of full attestation level, partial attestation level, or gateway attestation level, and/or the like. The full attestation level might require that a signing service provider is responsible for origination of a call, that the signing service provider has a direct authenticated relationship with the calling party and can identify the calling party, and that the signing service provider has established a verified association with an originating telephone number used by the calling party to request to connect the call with the called party. The partial attestation level might require that the signing service provider is responsible for origination of a call, that the signing service provider has a direct authenticated relationship with the calling party and can identify the calling party, and that the signing service provider has not established a verified association with an originating telephone number used by the calling party to request to connect the call with the called party. The gateway attestation level might require that the signing service provider has control over an entry point of a call into a network and that the signing service provider has no relationship with the originator of a call.

In some instances, the no solicitation application server might apply one of various treatment options in response to receiving the verified call setup message, wherein the various treatment options might comprise at least one of: connecting the call to the called party without any treatment for a calling party that has been whitelisted; connecting the call to the called party in response to a calling party below a first specified attestation level entering a random string of DTMF digits; playing a no solicitation announcement to a calling party below a second specified attestation level and disconnecting the call; or disconnecting the call without any announcement for a calling party below a third specified attestation level; and/or the like.

In some embodiments, the called party might be provided with options to set a preferred level of treatment for the no solicitation application server to implement in response to receiving the verified call setup message, wherein the options comprise at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls, and/or the like.

According to some aspects, various embodiments might implement validation of telephone number assignment using a universally unique identifier to telephone number database query, as described below with respect to FIG. 6 through 8. In some cases, a voice network or voice network control device might determine if an originating telephone number ("TN") associated with a call or session is specifically assigned to an originator of the call or session. The voice network or voice network control device might check the relationship between a universally unique identifier ("UUID") associated with a network interface or registrant and the originating TN delivered with the call in a UUID to TN relation database. If the UUID to TN relation is valid, the voice network or voice network control device might provide for marking of the call setup signaling message to indicate that the relation is valid. If no direct association is available between the UUID and TN in the database, the TN for the call may be marked as "Validation Failed" or "No Validation Performed" depending on the circumstance of the validation check.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, telephone technology, VoIP telephone technology, telephone solicitation prevention systems, and/or the like. In other aspects, certain embodiments, can improve the functioning of user equipment or systems themselves (e.g., telephone network systems, VoIP telephone systems, telephone solicitation prevention systems, etc.), for example, by sending, with a STI-VS, a verified call setup message to a no solicitation application server; in response to receiving the verified call setup, instructing, with the no solicitation application server, a media server to connect to a first gateway device and to play a no solicitation message requesting a response from a calling party; returning, with the media server, a reply message to the no solicitation application server indicating a connection point for a voice media path to the calling party; playing, with the media server, a prompt to the calling party, the prompt instructing the calling party to respond by performing one or more tasks; receiving, with the media server, a response from the calling party in accordance with at least one of the one or more tasks; returning, with the media server, the response to the no solicitation application server; verifying, with the no solicitation application server, whether the response is an appropriate response in accordance with at least one of the one or more tasks; based on a determination that the response has been verified to be an appropriate response, establishing a connected call between the calling party and the called party; and based on a determination that the response is not an appropriate response, performing one of: disconnecting the call; or forwarding the call to a voicemail server to play a voicemail message to the calling party in accordance with preferences of the called party, prior to disconnecting the call; and/or the like.

In particular, to the extent any abstract concepts are present in the various embodiments, those concepts can be implemented as described herein by devices, software, systems, and methods that involve specific novel functionality (e.g., steps or operations), such as, sending, with a STI-VS, a verified call setup message to a no solicitation application server; in response to receiving the verified call setup, instructing, with the no solicitation application server, a media server to connect to a first gateway device and to play a no solicitation message requesting a response from a calling party; returning, with the media server, a reply message to the no solicitation application server indicating a connection point for a voice media path to the calling party; playing, with the media server, a prompt to the calling party, the prompt instructing the calling party to respond by performing one or more tasks; receiving, with the media server, a response from the calling party in accordance with at least one of the one or more tasks; returning, with the media server, the response to the no solicitation application server; verifying, with the no solicitation application server, whether the response is an appropriate response in accordance with at least one of the one or more tasks; based on a determination that the response has been verified to be an appropriate response, establishing a connected call between the calling party and the called party; and based on a determination that the response is not an appropriate response, performing one of: disconnecting the call; or forwarding the call to a voicemail server to play a voicemail message to the calling party in accordance with preferences of the called party, prior to disconnecting the call; and/or the like, to name a few examples, that extend beyond mere conventional computer processing operations. These functionalities can produce tangible results outside of the implementing computer system, including, merely by way of example, optimized prevention of telephone solicitation (particularly, by robo-callers, automated calling systems, and/or the like), and/or the like, at least some of which may be observed or measured by customers and/or service providers.

In an aspect, a method might comprise receiving, with a first gateway device and from a calling party, a request to connect a call with a called party, the request including a called number associated with the called party; sending, with the first gateway device, a call setup request to a first call server in a first network; in response to receiving the call setup request, sending, with the first call server, a signing request to a secure telephone identity ("STI") authentication server ("AS"); in response to receiving the signing request, querying, with the STI-AS, a secure key server ("SKS") for a private key; setting, with the STI-AS, an attestation level for the calling party based on one or more attributes associated with the calling party; creating, with the STI-AS, a signed call setup message using the private key; and returning, with the STI-AS, the signed call setup message to the first call server.

The method might further comprise, in response to receiving the signed call setup message, selecting, with the first call server, a route through a plurality of call servers to a second call server in a second network, using the called number; sending, with the first call server, the signed call setup message to the second call server via the selected route; in response to receiving the signed call setup message, sending, with the second call server, a verification request to a STI verification server ("VS"); in response to receiving the verification request, querying, with the STI-VS, a certificate repository for a public key, based on information in the verification request; decrypting and verifying, with the STI-VS, the signed call setup message using the public key; sending, with the STI-VS, the decrypted call setup message to a no solicitation application server; instructing, with the no solicitation application server, a media server to connect to the first gateway device and to play a no solicitation message requesting a response from the calling party; returning, with the media server, a reply message to the no solicitation application server indicating a connection point for a voice media path to the calling party; and propagating, with the no solicitation application server, the response back through the first and second call servers to the calling party.

The method might further comprise enabling a path, with the first gateway device, between the calling party and the media server; playing, with the media server, a prompt to the calling party, the prompt instructing the calling party to perform at least one of entering a first series of numbers or speaking a first series of words; receiving, with the media server, a response from the calling party, the received response comprising at least one of a second series of entered numbers or a second series of spoken words; returning, with the media server, the response to the no solicitation application server; and comparing, with the no solicitation application server, the second series of entered numbers with the first series of numbers or the second series of spoken words with the first series of words.

Based on a determination that either the second series of entered numbers matches the first series of numbers or the second series of spoken words matches the first series of words, the method might comprise performing the following: directing, with the no solicitation application server, the STI-VS to connect the call; sending, with the STI-VS, a validated response to the second call server, along with an attestation level associated with the called party; sending, with the second call server, a call setup message to a second gateway device; sending, with the second gateway device, a setup message to the called party; propagating, with the second gateway device, a backward message via the first and second call servers and via the first gateway device, the backward message containing information regarding a media path to be set up; and establishing a connected call between the calling party and the called party, while clearing a media path between the first gateway device and the media server. Based on a determination that either the second series of entered numbers fails to match the first series of numbers or the second series of spoken words fails to match the first series of words, the method might comprise performing one of: disconnecting the call; or forwarding the call to a voicemail server to play a voicemail message to the calling party in accordance with preferences of the called party, prior to disconnecting the call.

In another aspect, a method might comprise receiving, with a first gateway device and from a calling party, a request to connect a call with a called party, the request including a called number associated with the called party; sending, with the first gateway device, a call setup request to a first call server in a first network; in response to receiving the call setup request, sending, with the first call server, a call setup message to a second call server in a second network; in response to receiving the call setup message, sending, with the second call server, a verification request to a secure telephone identity ("STI") verification server ("VS"); in response to receiving the verification request, verifying, with the STI-VS, the call setup message; sending, with the STI-VS, the verified call setup message to a no solicitation application server; in response to receiving the verified call setup, instructing, with the no solicitation application server, a media server to connect to the first gateway device and to play a no solicitation message requesting a response from the calling party; and returning, with the media server, a reply message to the no solicitation application server indicating a connection point for a voice media path to the calling party.

The method might further comprise playing, with the media server, a prompt to the calling party, the prompt instructing the calling party to respond by performing one or more tasks; receiving, with the media server, a response from the calling party in accordance with at least one of the one or more tasks; returning, with the media server, the response to the no solicitation application server; verifying, with the no solicitation application server, whether the response is an appropriate response in accordance with at least one of the one or more tasks; based on a determination that the response has been verified to be an appropriate response, establishing a connected call between the calling party and the called party; and based on a determination that the response is not an appropriate response, performing one of: disconnecting the call; or forwarding the call to a voicemail server to play a voicemail message to the calling party in accordance with preferences of the called party, prior to disconnecting the call.

In some embodiments, the method might further comprise, in response to receiving the call setup request, sending, with the first call server, a signing request to a STI authentication server ("AS"); in response to receiving the signing request, querying, with the STI-AS, a secure key server ("SKS") for a private key; setting, with the STI-AS, an attestation level for the calling party based on one or more attributes associated with the calling party; creating, with the STI-AS, a signed call setup message using the private key; returning, with the STI-AS, the signed call setup message to the first call server; and in response to receiving the signed call setup message, selecting, with the first call server, a route through a plurality of call servers to a second call server in a second network, using the called number; wherein sending the call setup message to the second call server comprises sending, with the first call server, the call setup message to the second call server via the selected route.

In some cases, the method might further comprise, in response to receiving the verification request, querying, with the STI-VS, a certificate repository for a public key, based on information in the verification request; wherein verifying the call setup message comprises decrypting and verifying, with the STI-VS, the signed call setup message using the public key.

In some instances, the attestation level for the calling party might comprise one of full attestation level, partial attestation level, or gateway attestation level, wherein the full attestation level requires that a signing service provider is responsible for origination of a call, that the signing service provider has a direct authenticated relationship with the calling party and can identify the calling party, and that the signing service provider has established a verified association with an originating telephone number used by the calling party to request to connect the call with the called party, wherein the partial attestation level requires that the signing service provider is responsible for origination of a call, that the signing service provider has a direct authenticated relationship with the calling party and can identify the calling party, and that the signing service provider has not established a verified association with an originating telephone number used by the calling party to request to connect the call with the called party, wherein the gateway attestation level requires that the signing service provider has control over an entry point of a call into a network and that the signing service provider has no relationship with the originator of a call.

According to some embodiments, the method might further comprise applying, with the no solicitation application server, one of various treatment options in response to receiving the verified call setup message, wherein the various treatment options might comprise at least one of: connecting the call to the called party without any treatment for a calling party that has been whitelisted; connecting the call to the called party in response to a calling party below a first specified attestation level entering a random string of DTMF digits; playing a no solicitation announcement to a calling party below a second specified attestation level and disconnecting the call; or disconnecting the call without any announcement for a calling party below a third specified attestation level.

In some embodiments, the method might further comprise, in response to receiving the reply message from the media server, propagating, with the no solicitation application server, the response back through the first and second call servers to the calling party; and enabling a path, with the first gateway device, between the calling party and the media server, prior to playing the prompt to the calling party.

In some instances, performing the one or more tasks might comprise at least one of entering a first series of numbers or speaking a first series of words, wherein the received response might comprise at least one of a second series of entered numbers or a second series of spoken words, wherein verifying the response might comprise comparing, with the no solicitation application server, the second series of entered numbers with the first series of numbers or the second series of spoken words with the first series of words. In some cases, the first series of numbers might comprise a random string of dual tone multi frequency ("DTMF") digits.

According to some embodiments, establishing the connected call between the calling party and the called party might comprise: directing, with the no solicitation application server, the STI-VS to connect the call; sending, with the STI-VS, a validated response to the second call server, along with an attestation level associated with the called party; sending, with the second call server, a call setup message to a second gateway device; sending, with a second gateway device, a setup message to the called party; propagating, with the second gateway device, a backward message via the first and second call servers and via the first gateway device, the backward message containing information regarding a media path to be set up; and establishing the connected call between the calling party and the called party, while clearing a media path between the first gateway device and the media server.

Merely by way of example, in some cases, at least one of the first gateway device, the first call server, the second call server, the STI-VS, or the no solicitation application server, and/or the like, might be disposed within a voice over Internet protocol ("VoIP"). In some instances, the called party might be provided with options to set a preferred level of treatment for the no solicitation application server to implement in response to receiving the verified call setup message, wherein the options might comprise at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls, and/or the like. In some cases, the first network and the second network might be the same network.

In yet another aspect, a system might comprise a first gateway device, a first call server, a second call server, a secure telephone identity ("STI") verification server ("VS"), a no solicitation application server, and a media server. The first gateway device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first gateway device to: receive, from a calling party, a request to connect a call with a called party, the request including a called number associated with the called party; and send a call setup request to the first call server in a first network.

The first call server might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the first call server to: receive the call setup request; and in response to receiving the call setup request, send a call setup message to the second call server in a second network.

The second call server might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the second call server to: receive the call setup message; and in response to receiving the call setup message, send a verification request to the STI-VS.

The STI-VS might comprise at least one fourth processor and a fourth non-transitory computer readable medium communicatively coupled to the at least one fourth processor. The fourth non-transitory computer readable medium might have stored thereon computer software comprising a fourth set of instructions that, when executed by the at least one fourth processor, causes the STI-VS to: receive the verification request; in response to receiving the verification request, verify the call setup message; and send the verified call setup message to the no solicitation application server.

The no solicitation application server might comprise at least one fifth processor and a fifth non-transitory computer readable medium communicatively coupled to the at least one fifth processor. The fifth non-transitory computer readable medium might have stored thereon computer software comprising a fifth set of instructions that, when executed by the at least one fifth processor, causes the no solicitation application server to: receive the verified call setup; and in response to receiving the verified call setup, instruct the media server to connect to the first gateway device and to play a no solicitation message requesting a response from the calling party.

The media server might comprise at least one sixth processor and a sixth non-transitory computer readable medium communicatively coupled to the at least one sixth processor. The sixth non-transitory computer readable medium might have stored thereon computer software comprising a sixth set of instructions that, when executed by the at least one sixth processor, causes the media server to: return a reply message to the no solicitation application server indicating a connection point for a voice media path to the calling party; play a prompt to the calling party, the prompt instructing the calling party to respond by performing one or more tasks; receive a response from the calling party in accordance with at least one of the one or more tasks; and return the response to the no solicitation application server.

The fifth set of instructions, when executed by the at least one fifth processor, might further cause the no solicitation application server to: verify whether the response is an appropriate response in accordance with at least one of the one or more tasks; based on a determination that the response has been verified to be an appropriate response, establish a connected call between the calling party and the called party; and based on a determination that the response is not an appropriate response, perform one of: disconnecting the call; or forwarding the call to a voicemail server to play a voicemail message to the calling party in accordance with preferences of the called party, prior to disconnecting the call.

In some embodiments, the fifth set of instructions, when executed by the at least one fifth processor, might further cause the no solicitation application server to: apply one of various treatment options in response to receiving the verified call setup message, wherein the various treatment options might comprise at least one of: connecting the call to the called party without any treatment for a calling party that has been whitelisted; connecting the call to the called party in response to a calling party below a first specified attestation level entering a random string of DTMF digits; playing a no solicitation announcement to a calling party below a second specified attestation level and disconnecting the call; or disconnecting the call without any announcement for a calling party below a third specified attestation level; and/or the like.

According to some embodiments, performing the one or more tasks might comprise at least one of entering a first series of numbers or speaking a first series of words, wherein the received response might comprise at least one of a second series of entered numbers or a second series of spoken words, wherein verifying the response might comprise comparing, with the no solicitation application server, the second series of entered numbers with the first series of numbers or the second series of spoken words with the first series of words. In some cases, the first series of numbers might comprise a random string of dual tone multi frequency ("DTMF") digits.

In some embodiments, establishing the connected call between the calling party and the called party might comprise directing, with the no solicitation application server, the STI-VS to connect the call; sending, with the STI-VS, a validated response to the second call server, along with an attestation level associated with the called party; sending, with the second call server, a call setup message to a second gateway device; sending, with a second gateway device, a setup message to the called party; propagating, with the second gateway device, a backward message via the first and second call servers and via the first gateway device, the backward message containing information regarding a media path to be set up; and establishing the connected call between the calling party and the called party, while clearing a media path between the first gateway device and the media server.

According to some embodiments, at least one of the first gateway device, the first call server, the second call server, the STI-VS, or the no solicitation application server, and/or the like, might be disposed within a voice over Internet protocol ("VoIP").

In some cases, the called party might be provided with options to set a preferred level of treatment for the no solicitation application server to implement in response to receiving the verified call setup message, wherein the options might comprise at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls, and/or the like.

In an aspect, a method might comprise receiving, with a first gateway device and from a calling party, a request to connect a call with a called party, the request including a called number associated with the called party; and sending, with the first gateway device, a call setup request to a first call server in a first network. The method might further comprise determining, with the first call server, whether the call setup request contains a universally unique identifier ("UUID") associated with an originating network interface that corresponds to a calling device associated with the calling party; based on a determination that the call setup request does not contain a UUID associated with the originating network interface, querying, with the first call server, whether a database, which is communicatively coupled to the first call server, contains the UUID associated with the originating network interface, wherein the query contains the UUID and a calling number associated with the calling party; and sending, with the first call server, a UUID to telephone number ("TN") validation request to a UUID to TN database. The method might also comprise determining, with the UUID to TN database, whether the UUID has a direct assignment relationship with the calling number; determining, with the UUID to TN database, at least one of a verification status or an attestation level, based at least in part on the determined relationship between the UUID and the calling number; and sending, with the UUID to TN database and to the first call server, a response containing the determined at least one of the verification status or the attestation level. The method might further comprise sending, with the first call server, a setup message to a second call server, wherein the setup message contains the UUID, the calling TN, or the determined at least one of the verification status or the attestation level; and based at least in part on one or more of the UUID or the determined at least one of the verification status or the attestation level, applying, with the second call server, one of various treatment options related to the call.

In some embodiments, the various treatment options might comprise at least one of: connecting the call to the called party without any treatment for the highest level of verification status or attestation level; applying a first preestablished treatment option below a first specified level of verification status or attestation level; applying a second preestablished treatment option below a second specified level of verification status or attestation level; or disconnecting the call without any announcement below a third specified level of verification status or attestation level; and/or the like.

According to some embodiments, the originating network interface might comprise at least one of a physical port, a logical port, a physical circuit, a physical trunk group, a logical trunk group, or an Internet protocol ("IP") address, and/or the like. In some cases, the calling device associated with the calling party might comprise at least one of a telephone, a voice over Internet protocol ("VoIP") private branch exchange ("PBX"), a time-division multiplexing ("TDM") voice PBX, a VoIP soft client, a facsimile machine, or a voice origination device, and/or the like. In some instances, the database and the UUID to TN database might be the same database. According to some embodiments, the UUID might be assigned to a group of users (such as a company or the like), wherein each user within the group of users shares the same UUID. In some cases, the query to the database might further comprise at least one of one or more originating time stamps, the called number, or a querying element identification, and/or the like.

In some embodiments, the attestation level for the calling party might comprise one of full attestation level, partial attestation level, or gateway attestation level, and/or the like. The full attestation level might require that a signing service provider is responsible for origination of a call, that the signing service provider has a direct authenticated relationship with the calling party and can identify the calling party, and that the signing service provider has established a verified association with the calling number used by the calling party to request to connect the call with the called party. The partial attestation level might require that the signing service provider is responsible for origination of a call, that the signing service provider has a direct authenticated relationship with the calling party and can identify the calling party, and that the signing service provider has not established a verified association with the calling number used by the calling party to request to connect the call with the called party. The gateway attestation level might require that the signing service provider has control over an entry point of a call into a network and that the signing service provider has no relationship with the originator of a call.

According to some embodiments, the called party might be provided with options to set a preferred level of treatment for the second call server to implement in response to receiving the setup message, wherein the options might comprise at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls, and/or the like.

In another aspect, a system might comprise a first gateway device, a first call server, a universally unique identifier ("UUID") to telephone number ("TN") database, and a second call server. The first gateway device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first gateway device to: receive, from a calling party, a request to connect a call with a called party, the request including a called number associated with the called party; and send a call setup request to a first call server in a first network.

The first call server might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the first call server to: determine whether the call setup request contains a UUID associated with an originating network interface that corresponds to a calling device associated with the calling party; based on a determination that the call setup request does not contain a UUID associated with the originating network interface, query whether a database, which is communicatively coupled to the first call server, contains the UUID associated with the originating network interface, wherein the query contains the UUID and a calling number associated with the calling party; and send a UUID to TN validation request to a UUID to TN database.

The UUID to TN database might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the UUID to TN database to: determine whether the UUID has a direct assignment relationship with the calling number; determine at least one of a verification status or an attestation level, based at least in part on the determined relationship between the UUID and the calling number; and send, to the first call server, a response containing the determined at least one of the verification status or the attestation level.

The second set of instructions, when executed by the at least one second processor, might further cause the first call server to: send a setup message to a second call server, wherein the setup message contains the UUID, the calling TN, or the determined at least one of the verification status or the attestation level.

The second call server might comprise at least one fourth processor and a fourth non-transitory computer readable medium communicatively coupled to the at least one fourth processor. The fourth non-transitory computer readable medium might have stored thereon computer software comprising a fourth set of instructions that, when executed by the at least one fourth processor, causes the second call server to: based at least in part on one or more of the UUID or the determined at least one of the verification status or the attestation level, apply one of various treatment options related to the call.

In some embodiments, the various treatment options might comprise at least one of: connecting the call to the called party without any treatment for the highest level of verification status or attestation level; applying a first preestablished treatment option below a first specified level of verification status or attestation level; applying a second preestablished treatment option below a second specified level of verification status or attestation level; or disconnecting the call without any announcement below a third specified level of verification status or attestation level; and/or the like.

According to some embodiments, the originating network interface might comprise at least one of a physical port, a logical port, a physical circuit, a physical trunk group, a logical trunk group, or an Internet protocol ("IP") address, and/or the like. In some cases, the calling device associated with the calling party might comprise at least one of a telephone, a voice over Internet protocol ("VoIP") private branch exchange ("PBX"), a time-division multiplexing ("TDM") voice PBX, a VoIP soft client, a facsimile machine, or a voice origination device, and/or the like. In some instances, the database and the UUID to TN database might be the same database. According to some embodiments, the UUID might be assigned to a group of users (such as a company or the like), wherein each user within the group of users shares the same UUID. In some cases, the query to the database might further comprise at least one of one or more originating time stamps, the called number, or a querying element identification, and/or the like.

In some embodiments, the attestation level for the calling party might comprise one of full attestation level, partial attestation level, or gateway attestation level, and/or the like. The full attestation level might require that a signing service provider is responsible for origination of a call, that the signing service provider has a direct authenticated relationship with the calling party and can identify the calling party, and that the signing service provider has established a verified association with the calling number used by the calling party to request to connect the call with the called party. The partial attestation level might require that the signing service provider is responsible for origination of a call, that the signing service provider has a direct authenticated relationship with the calling party and can identify the calling party, and that the signing service provider has not established a verified association with the calling number used by the calling party to request to connect the call with the called party. The gateway attestation level might require that the signing service provider has control over an entry point of a call into a network and that the signing service provider has no relationship with the originator of a call.

According to some embodiments, the called party might be provided with options to set a preferred level of treatment for the second call server to implement in response to receiving the setup message, wherein the options might comprise at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing telephone solicitation prevention using enhanced voice over Internet protocol ("VoIP") functionalities in conjunction with secure telephone identity revisited ("STIR") secure handling of asserted information using tokens ("SHAKEN") protocols, as referred to above. The methods, systems, and apparatuses illustrated by FIGS. 1-5 refer to examples of different embodiments that include various components and steps, which can be considered alternatives or which can be used in conjunction with one another in the various embodiments. FIG. 6-8 illustrate some of the features of the method, system, and apparatus for implementing validation of telephone number assignment using a universally unique identifier to telephone number database query, as referred to above. The methods, systems, and apparatuses illustrated by FIGS. 6-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing telephone solicitation prevention using enhanced voice over Internet protocol ("VoIP") functionalities in conjunction with secure telephone identity revisited ("STIR") secure handling of asserted information using tokens ("SHAKEN") protocols, in accordance with various embodiments.

In the non-limiting embodiment of FIG. 1, system 100 might comprise a first gateway device 105 (which might include, without limitation, an interrogating border control function/trunking gateway, or the like), a first session initiation protocol ("SIP") user agent ("UA") 110, a first call session control function ("CSCF") 115, a secure telephone identity ("STI") authentication server ("AS") 120, and a secure key server ("SKS") 125, each of which might be disposed in a first network 130. System 100 might further comprise a second gateway device 135 (which might include, without limitation, an interrogating border control function/trunking gateway, or the like), a second session initiation protocol ("SIP") user agent ("UA") 140, a second call session control function ("CSCF") 145, a voice over Internet protocol ("VoIP") authentication server ("AS") 150, and a media server 155, each of which might be disposed in a second network 160. System 100 might further comprise a certificate provisioning service system 165 and a STI certificate repository ("STI-CR") 170.

In operation, an originating caller or calling party might place a call via a calling device or SIP UA 110 (which might include, without limitation, a telephone, a smart phone, or a mobile phone, and/or the like) to a called party at a called device or SIP UA 140 (which might include, without limitation, a telephone, a smart phone, or a mobile phone, and/or the like), using a called number. The SIP UA 110 might send a call setup request to the originating gateway or the first gateway device 105 (which might include, without limitation, a voice over Internet protocol ("VoIP") gateway, a session border controller ("SBC"), and/or the like), via session initiation protocol ("SIP"), or the like, via the first CSCF 115. That is, the SIP UA 110 might send the call setup request (via SIP, or the like) to the first CSCF 115. The first CSCF 115 might be secure telephone identity revisited ("STIR")-enabled for this caller and might send a signing request (via SIP, or the like) to STI-AS 120. The STI-AS 120 might query the SKS 125 (using secure hypertext transfer protocol ("HTTPS"), or the like) for a private key of the first network 130, and the SKS 125 might return the private key to the STI-AS 120. The first CSCF 115 might select a route through a plurality of call servers to the terminating or second CSCF 145 in the second network 160, using the called number, and might send the call request to the second CSCF 145 (using SIP, or the like) via the first gateway device 105 and the second gateway device 135.

The STI-AS 120 might set an attestation level for the calling party based on one or more attributes associated with the calling party, might create a signature and might return a signed call setup message to the first CSCF 115, in some cases according to STIR/secure handling of asserted information using tokens ("SHAKEN") standards. In some instances, the attestation level for the calling party might include, without limitation, one of full attestation level, partial attestation level, or gateway attestation level, and/or the like. Here, the full attestation level might require that a signing service provider is responsible for origination of a call, that the signing service provider has a direct authenticated relationship with the calling party and can identify the calling party, and that the signing service provider has established a verified association with an originating telephone number used by the calling party to request to connect the call with the called party. The partial attestation level might require that the signing service provider is responsible for origination of a call, that the signing service provider has a direct authenticated relationship with the calling party and can identify the calling party, and that the signing service provider has not established a verified association with an originating telephone number used by the calling party to request to connect the call with the called party. The gateway attestation level might require that the signing service provider has control over an entry point of a call into a network and that the signing service provider has no relationship with the originator of a call.

The second CSCF 145 might send a verification request (using SIP, or the like) to the VoIP AS 150. The VOIP AS 150 might query the certificate repository ("STI-CR") 170 for a public key (using HTTPS, or the like), based on information in the verification request (per STIR/SHAKEN protocols). The STI-CR 170 might request and retrieve the public key from the certificate provisioning service system 165 (using HTTPS, or the like), and might return the public key to the VOIP AS 150. The VOIP AS 150 might decrypt and verify the signed call setup message using the public key, and might instruct the media server 155 to connect to the first gateway 105 and to play a no solicitation message requesting a response from the calling party. The media server 155 might return a reply message to the VoIP AS 150 indicating a connection point for a voice media path to the calling party. This information might be propagated back through the CSCFs 115 and 145 and the gateways 105 and 135 to the calling party at SIP UA 110, or the like. The first gateway device 105 might enable the path from the calling party to the media server 155. The media server 155 might play a prompt to the calling party to perform one or more tasks. In some embodiments, the prompt might instruct the calling party to perform at least one of entering a first series of numbers (via a dual tone multi frequency ("DTMF") pad or the like on the SIP UA 110) or speaking a first series of words (and/or numbers), and/or the like. The calling party might respond to the prompt, with the media server 155 receiving the response from the calling party. In some cases, the received response might include, without limitation, at least one of a second series of entered numbers or a second series of spoken words, and/or the like. The media server 155 might return the response to the VoIP AS 150.

The VoIP AS 150 might determine whether the response is an appropriate response. In some embodiments, determining whether the response is an appropriate response might comprise comparing, with the VoIP AS 150, the second series of entered numbers with the first series of numbers or the second series of spoken words with the first series of words; and determining whether either the second series of entered numbers matches the first series of numbers or the second series of spoken words matches the first series of words.

Based on a determination that the response is an appropriate response (that is, in some cases, based on a determination that either the second series of entered numbers matches the first series of numbers or the second series of spoken words matches the first series of words), the VoIP AS 150 might direct the second gateway 135 and/or the second CSCF 145 to connect or to complete the call. The VOIP AS 150 might send a validated response to the second CSCF 145, along with an attestation level associated with the called party. The second CSCF 145 might send a call setup message to the second gateway device 135 (which might include, without limitation, a voice over Internet protocol ("VoIP") gateway, a session border controller ("SBC"), and/or the like) or to the second SIP UA 140 (using SIP, or the like). The second gateway device 135 might send a setup message to the called party at the SIP UA 140, using SIP, or the like, via the second CSCF 145. The second gateway device 135 might propagate a backward message to the calling party at the SIP UA 110 via the first CSCF 115 and via the first gateway device 105, the backward message containing information regarding a media path to be set up. A connected call might subsequently be established between the calling party at the SIP UA 110 and the called party at the called device or SIP UA 140 (using real-time transport protocol ("RTP"), or the like), via the first and second gateway devices 105 and 135, while clearing a media path between the first gateway device 105 and the media server 155.

On the other hand, based on a determination that the response is not an appropriate response (that is, in some cases, based on a determination that either the second series of entered numbers fails to match the first series of numbers or the second series of spoken words fails to match the first series of words), the VoIP AS 150 might forward the call to a voicemail server (not shown) to play a voicemail message to the calling party at the SIP UA 110 in accordance with preferences of the called party (optional); and disconnecting the call.

In this manner, calls initiated by robo-callers or the like might be prevented from connecting with the called party, while allowing certain other calls by legitimate calling parties, all based at least in part on determined attestation levels of the calling party, or the like.

Figure 2:
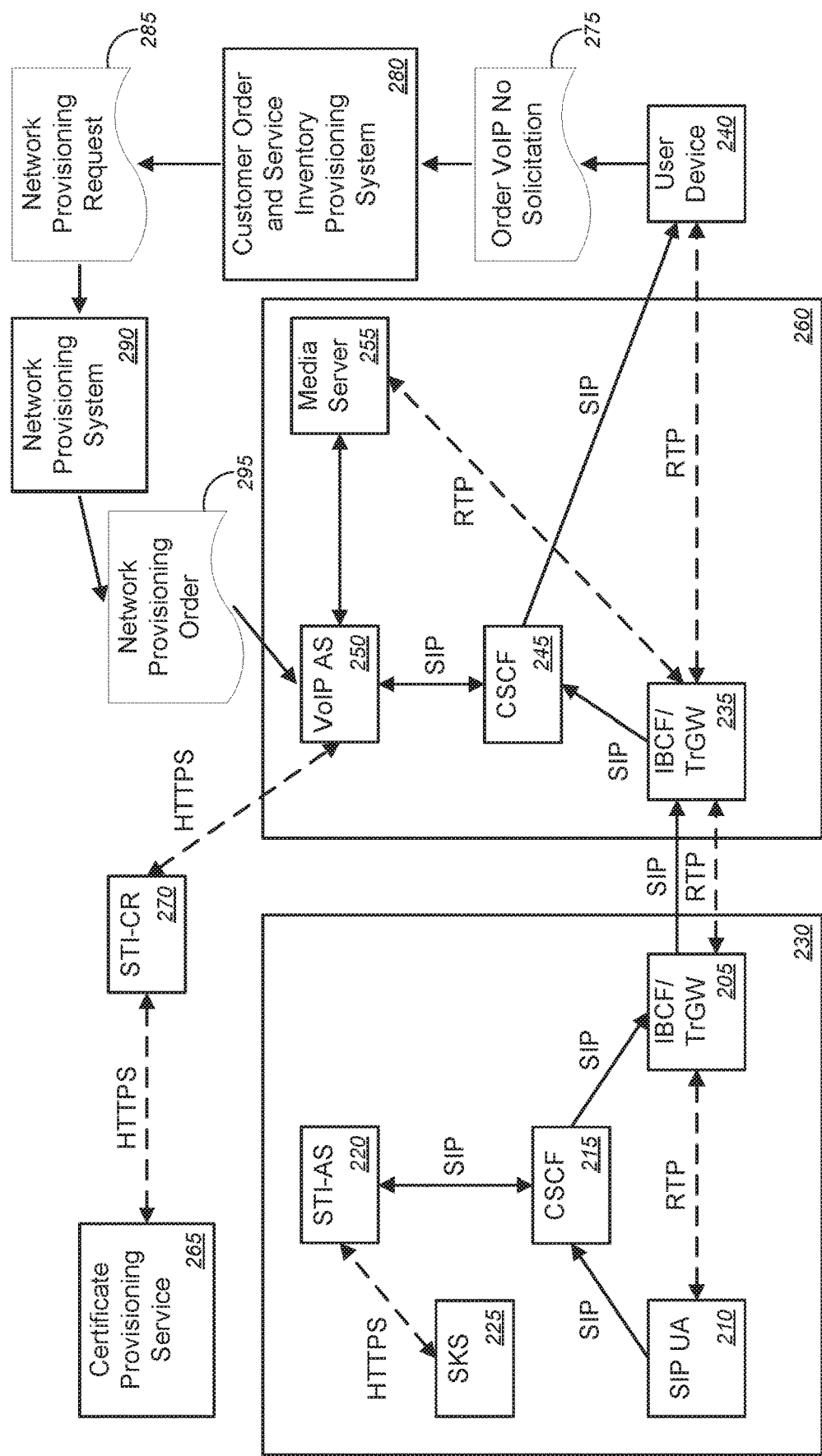
FIG. 2 is a schematic diagram illustrating another system for implementing telephone solicitation prevention using enhanced VoIP functionalities in conjunction with STIR/SHAKEN protocols, in accordance with various embodiments.

FIG. 2 is a schematic diagram illustrating another system 200 for implementing telephone solicitation prevention using enhanced VoIP functionalities in conjunction with STIR/SHAKEN protocols, in accordance with various embodiments.

In the non-limiting embodiment of FIG. 2, system 200 might comprise a first gateway device 205 (which might include, without limitation, an interrogating border control function/trunking gateway, or the like), a first session initiation protocol ("SIP") user agent ("UA") 210, a first call session control function ("CSCF") 215, a secure telephone identity ("STI") authentication server ("AS") 220, and a secure key server ("SKS") 225, each of which might be disposed in a first network 230. System 200 might further comprise a second gateway device 235 (which might include, without limitation, an interrogating border control function/trunking gateway, or the like), a second session initiation protocol ("SIP") user agent ("UA") or user device 240, a second call session control function ("CSCF") 245, a voice over Internet protocol ("VoIP") authentication server ("AS") 250, and a media server 255, each of which might be disposed in a second network 260. System 200 might further comprise a certificate provisioning service system 265 and a STI certificate repository ("STI-CR") 270.

In operation, a user (which might be a future called party) might order VoIP no solicitation service (block 275). Such an order might be received by a customer order and service inventory provisioning system 280, which might send a network provisioning request (block 285) to a network provisioning system 290, which might send a network provisioning order (block 295) to the VoIP-AS 250. In ordering the VoIP no solicitation service, the user might provide user preferences related to how the VoIP-AS 250 might handle a call request from a calling party, based on attestation levels associated with particular calling parties. Such preferences based on caller attestation levels may be customizable by the user. In some embodiments, the user or the called party might be provided with options to set a preferred level of treatment for the no solicitation application server to implement in response to receiving the verified call setup message. For example, the options might include, but is not limited to, at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls, and/or the like.

After the VoIP no solicitation service has been ordered by the user using user device 240, system 200 might function in a similar manner as system 100 of FIG. 1. In particular, like system 100, an originating caller or calling party might place a call via a calling device or SIP UA 210 (which might include, without limitation, a telephone, a smart phone, or a mobile phone, and/or the like) to the user (or called party) at user device 240 (which might include, without limitation, a telephone, a smart phone, or a mobile phone, and/or the like), using a called number. The SIP UA 210 might send a call setup request to the originating gateway or the first gateway device 205 (which might include, without limitation, a voice over Internet protocol ("VoIP") gateway, a session border controller ("SBC"), and/or the like), via session initiation protocol ("SIP"), or the like, via the first CSCF 215. That is, the SIP UA 210 might send the call setup request (via SIP, or the like) to the first CSCF 215. The first CSCF 215 might be secure telephone identity revisited ("STIR")-enabled for this caller and might send a signing request (via SIP, or the like) to STI-AS 220. The STI-AS 220 might query the SKS 225 (using secure hypertext transfer protocol ("HTTPS"), or the like) for a private key of the first network 230, and the SKS 225 might return the private key to the STI-AS 220. The first CSCF 215 might select a route through a plurality of call servers to the terminating or second CSCF 245 in the second network 260, using the called number, and might send the call request to the second CSCF 245 (using SIP, or the like) via the first gateway device 205 and the second gateway device 235.

The STI-AS 220 might set an attestation level for the calling party based on one or more attributes associated with the calling party, might create a signature and might return a signed call setup message to the first CSCF 215, in some cases according to STIR/secure handling of asserted information using tokens ("SHAKEN") standards. In some instances, the attestation level for the calling party might include, without limitation, one of full attestation level, partial attestation level, or gateway attestation level, and/or the like. Here, the full attestation level might require that a signing service provider is responsible for origination of a call, that the signing service provider has a direct authenticated relationship with the calling party and can identify the calling party, and that the signing service provider has established a verified association with an originating telephone number used by the calling party to request to connect the call with the called party. The partial attestation level might require that the signing service provider is responsible for origination of a call, that the signing service provider has a direct authenticated relationship with the calling party and can identify the calling party, and that the signing service provider has not established a verified association with an originating telephone number used by the calling party to request to connect the call with the called party. The gateway attestation level might require that the signing service provider has control over an entry point of a call into a network and that the signing service provider has no relationship with the originator of a call.

The second CSCF 245 might send a verification request (using SIP, or the like) to the VoIP AS 250. The VOIP AS 250 might query the certificate repository ("STI-CR") 270 for a public key (using HTTPS, or the like), based on information in the verification request (per STIR/SHAKEN protocols). The STI-CR 270 might request and retrieve the public key from the certificate provisioning service system 265 (using HTTPS, or the like), and might return the public key to the VOIP AS 250. The VOIP AS 250 might decrypt and verify the signed call setup message using the public key, and might instruct the media server 255 to connect to the first gateway 205 and to play a no solicitation message requesting a response from the calling party. The media server 255 might return a reply message to the VoIP AS 250 indicating a connection point for a voice media path to the calling party. This information might be propagated back through the CSCFs 215 and 245 and the gateways 205 and 235 to the calling party at SIP UA 210, or the like. The first gateway device 205 might enable the path from the calling party to the media server 255. The media server 255 might play a prompt to the calling party to perform one or more tasks. In some embodiments, the prompt might instruct the calling party to perform at least one of entering a first series of numbers (via a dual tone multi frequency ("DTMF") pad or the like on the SIP UA 210) or speaking a first series of words (and/or numbers), and/or the like. The calling party might respond to the prompt, with the media server 255 receiving the response from the calling party. In some cases, the received response might include, without limitation, at least one of a second series of entered numbers or a second series of spoken words, and/or the like. The media server 255 might return the response to the VoIP AS 250.

The VoIP AS 250 might determine whether the response is an appropriate response. In some embodiments, determining whether the response is an appropriate response might comprise comparing, with the VoIP AS 250, the second series of entered numbers with the first series of numbers or the second series of spoken words with the first series of words; and determining whether either the second series of entered numbers matches the first series of numbers or the second series of spoken words matches the first series of words.

Based on a determination that the response is an appropriate response (that is, in some cases, based on a determination that either the second series of entered numbers matches the first series of numbers or the second series of spoken words matches the first series of words), the VoIP AS 250 might direct the second gateway 235 and/or the second CSCF 245 to connect or to complete the call. The VOIP AS 250 might send a validated response to the second CSCF 245, along with an attestation level associated with the called party. The second CSCF 245 might send a call setup message to the second gateway device 235 (which might include, without limitation, a voice over Internet protocol ("VoIP") gateway, a session border controller ("SBC"), and/or the like) or to the second SIP UA 240 (using SIP, or the like). The second gateway device 235 might send a setup message to the called party at the SIP UA 240, using SIP, or the like, via the second CSCF 245. The second gateway device 235 might propagate a backward message to the calling party at the SIP UA 210 via the first CSCF 215 and via the first gateway device 205, the backward message containing information regarding a media path to be set up.

A connected call might subsequently be established between the calling party at the SIP UA 210 and the called party at the called device or SIP UA 240 (using real-time transport protocol ("RTP"), or the like), via the first and second gateway devices 205 and 235, while clearing a media path between the first gateway device 205 and the media server 255.

On the other hand, based on a determination that the response is not an appropriate response (that is, in some cases, based on a determination that either the second series of entered numbers fails to match the first series of numbers or the second series of spoken words fails to match the first series of words), the VoIP AS 250 might forward the call to a voicemail server (not shown) to play a voicemail message to the calling party at the SIP UA 210 in accordance with preferences of the called party (optional); and disconnecting the call.

Alternatively, the VoIP AS 250 might apply one of various treatment options in response to receiving the verified call setup message and based on the preferences set by the user. The various treatment options might include, without limitation, connecting the call to the called party without any treatment for a calling party that has been whitelisted; connecting the call to the called party in response to a calling party below a first specified attestation level entering a random string of DTMF digits or speaking a set verbal phrase; playing a no solicitation announcement to a calling party below a second specified attestation level and disconnecting the call; or disconnecting the call without any announcement for a calling party below a third specified attestation level; and/or the like.

In this manner, calls initiated by robo-callers or the like might be prevented from connecting with the called party, while allowing certain other calls by legitimate calling parties, all based at least in part on determined attestation levels of the calling party and/or on preferences established by the user (or called party), or the like.

Figure 3:
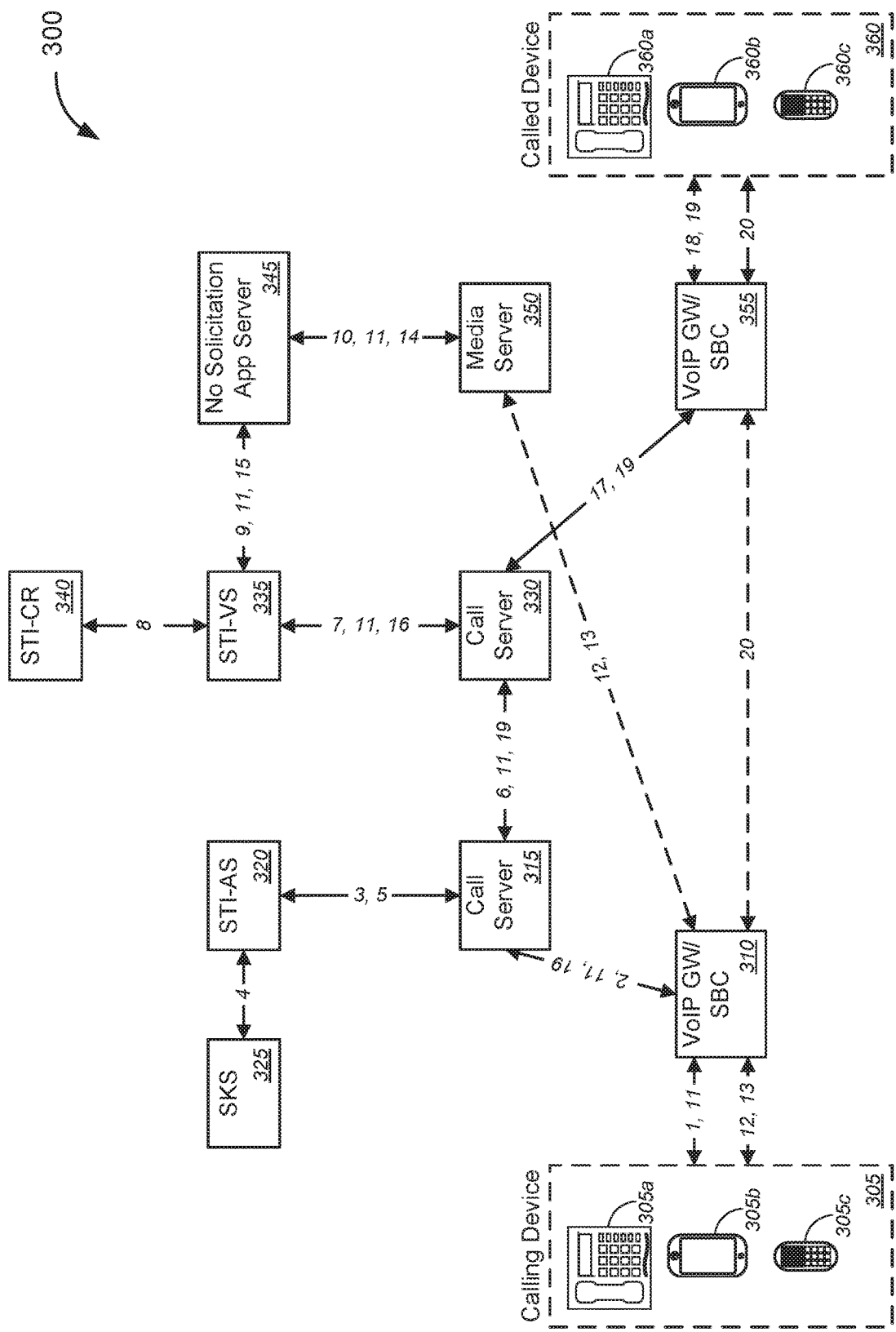
FIG. 3 is a schematic block diagram illustrating a method for implementing telephone solicitation prevention using enhanced VoIP functionalities in conjunction with STIR/SHAKEN protocols, in accordance with various embodiments.

FIG. 3 is a schematic block diagram illustrating a method 300 for implementing telephone solicitation prevention using enhanced VoIP functionalities in conjunction with STIR/SHAKEN protocols, in accordance with various embodiments.

In the non-limiting embodiment of method 300 of FIG. 3, an originating caller or calling party might place a call via calling device 305 (which might include, without limitation, a telephone 305*a*, a smart phone 305*b*, or a mobile phone 305*c*, and/or the like) to a called party at a called device (which might include, without limitation, a telephone 360*a*, a smart phone 360*b*, or a mobile phone 360*c*, and/or the like), using a called number. At step 1, the calling device 305 might send a call setup request to an originating gateway or a first gateway device 310 (which might include, without limitation, a voice over Internet protocol ("VoIP") gateway, a session border controller ("SBC"), and/or the like). At step 2, the first gateway device 310 might send the call setup request to an originating call server or first call server 315. At step 3, the originating call server or first call server 315 might be secure telephone identity revisited ("STIR")-enabled for this caller and might send a signing request to a secure telephone identity ("STI") authentication server ("AS") 320. At step 4, STI-AS might query a secure key server ("SKS") 325 for a private key of a first network or originating network, and the SKS might return the private key to the STI-AS 320.

At step 5, the STI-AS 320 might set an attestation level for the calling party based on one or more attributes associated with the calling party, might create a signature and might return a signed call setup message to the first call server 315, in some cases according to STIR/secure handling of asserted information using tokens ("SHAKEN") standards. In some instances, the attestation level for the calling party might include, without limitation, one of full attestation level, partial attestation level, or gateway attestation level, and/or the like. Here, the full attestation level might require that a signing service provider is responsible for origination of a call, that the signing service provider has a direct authenticated relationship with the calling party and can identify the calling party, and that the signing service provider has established a verified association with an originating telephone number used by the calling party to request to connect the call with the called party. The partial attestation level might require that the signing service provider is responsible for origination of a call, that the signing service provider has a direct authenticated relationship with the calling party and can identify the calling party, and that the signing service provider has not established a verified association with an originating telephone number used by the calling party to request to connect the call with the called party. The gateway attestation level might require that the signing service provider has control over an entry point of a call into a network and that the signing service provider has no relationship with the originator of a call (i.e., the calling party).

At step 6, the originating or first call server 315 might select a route through a plurality of call servers to a terminating or second call server 330 in a second network, using the called number. At step 7, the terminating or second call server 330 might send a verification request to a STI verification server ("VS") 335. At step 8, the STI-VS 335 might query a certificate repository ("STI-CR") 340 for a public key, based on information in the verification request (per STIR/SHAKEN protocols), and might return the public key to the STI-VS 335. At step 9, the STI-VS 335 might decrypt and verify the signed call setup message using the public key, and might send the decrypted call setup message to a no solicitation application server 345. At step 10, the no solicitation application server 345 might run no solicitation service and might instruct a media server 350 to connect to the originating gateway and to play a no solicitation message requesting a response from the calling party. At step 11, the media server 350 might return a reply message to the no solicitation application server 345 indicating a connection point for a voice media path to the calling party. This information might be propagated back through the call servers to the calling party (e.g., via the no solicitation application server 345, the STI-VS 335, the second call server 330, the first call server 315, the first gateway device 310, and the calling device 305, or the like). The originating or first gateway device 310 might enable the path from the calling party to the media server 350. At step 12, the media server 350 might play a prompt to the calling party to perform one or more tasks. In some embodiments, the prompt might instruct the calling party to perform at least one of entering a first series of numbers (via a dual tone multi frequency ("DTMF") pad or the like on the calling device 305) or speaking a first series of words (and/or numbers), and/or the like. At step 13, the calling party might respond to the prompt, with the media server 350 receiving the response from the calling party. In some cases, the received response might include, without limitation, at least one of a second series of entered numbers or a second series of spoken words, and/or the like. At step 14, the media server 350 might return the response to the no solicitation application server 345.

The no solicitation application server 345 might determine whether the response is an appropriate response. In some embodiments, determining whether the response is an appropriate response might comprise comparing, with the no solicitation application server 345, the second series of entered numbers with the first series of numbers or the second series of spoken words with the first series of words; and determining whether either the second series of entered numbers matches the first series of numbers or the second series of spoken words matches the first series of words.

Based on a determination that the response is an appropriate response (that is, in some cases, based on a determination that either the second series of entered numbers matches the first series of numbers or the second series of spoken words matches the first series of words), at step 15, the no solicitation application server 345 might direct the STI-VS 335 to connect or to complete the call. At step 16, the STI-VS 335 might send a validated response to the terminating or second call server 330, along with an attestation level associated with the called party. At step 17, the second call server 330 might send a call setup message to a terminating or second gateway device 355 (which might include, without limitation, a voice over Internet protocol ("VoIP") gateway, a session border controller ("SBC"), and/or the like). At step 18, the terminating or second gateway device 355 might send a setup message to the called party at the called device 360. At step 19, the second gateway device 355 might propagate a backward message to the calling party at the calling device 305 via the first and second call servers 315 and 330 and via the first gateway device 310, the backward message containing information regarding a media path to be set up. At step 20, a connected call might be established between the calling party at the calling device 305 and the called party at the called device 360, while clearing a media path between the first gateway device 310 and the media server 350.

On the other hand, based on a determination that the response is not an appropriate response (that is, in some cases, based on a determination that either the second series of entered numbers fails to match the first series of numbers or the second series of spoken words fails to match the first series of words), the no solicitation application server 345 might forward the call to a voicemail server (not shown) to play a voicemail message to the calling party at the calling device 305 in accordance with preferences of the called party (optional); and disconnecting the call.

Figure 4A:
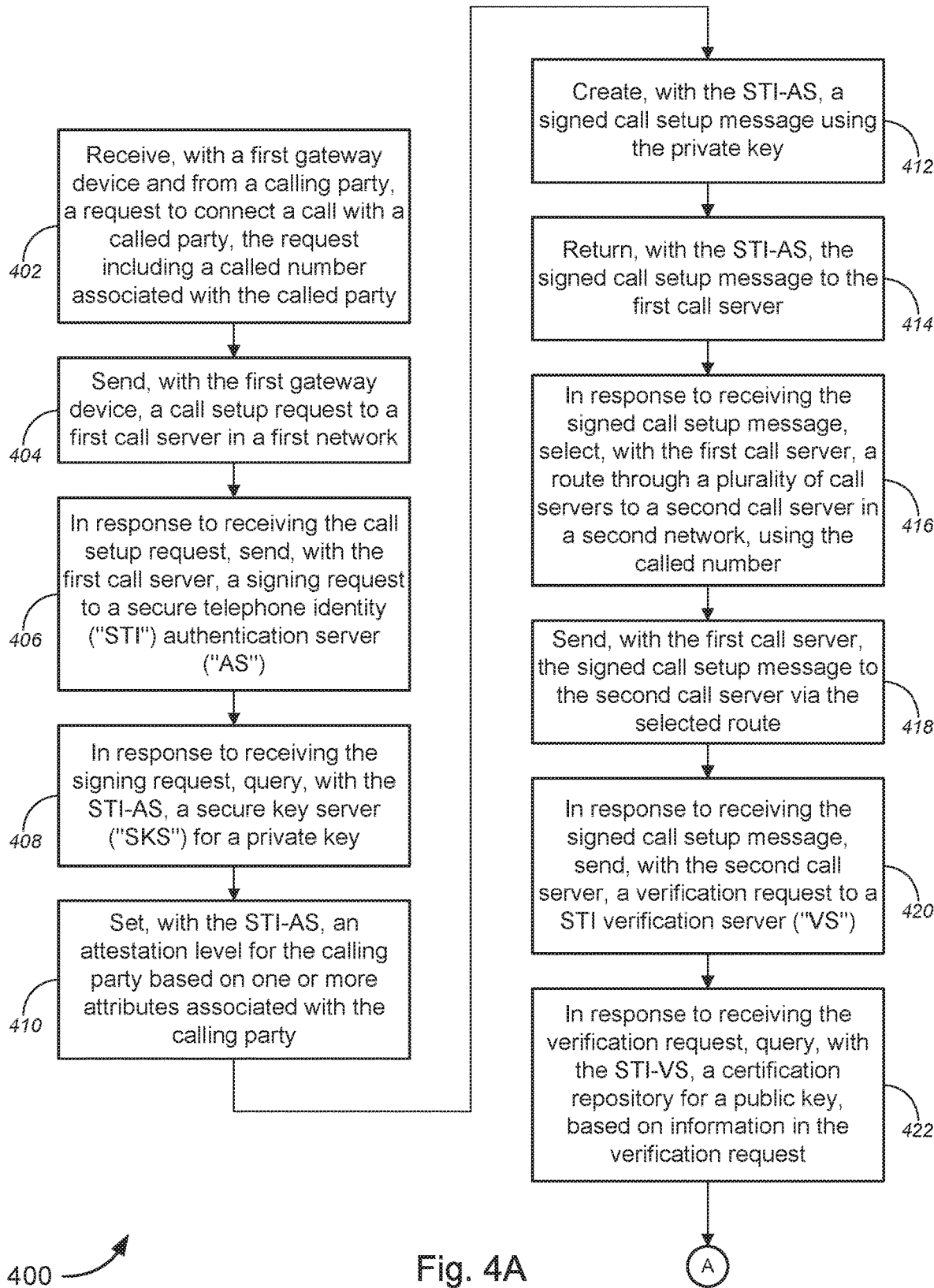
FIGS. 4A-4C are flow diagrams illustrating a method for implementing telephone solicitation prevention using enhanced VoIP functionalities in conjunction with STIR/SHAKEN protocols, in accordance with various embodiments.
Figure 4B:
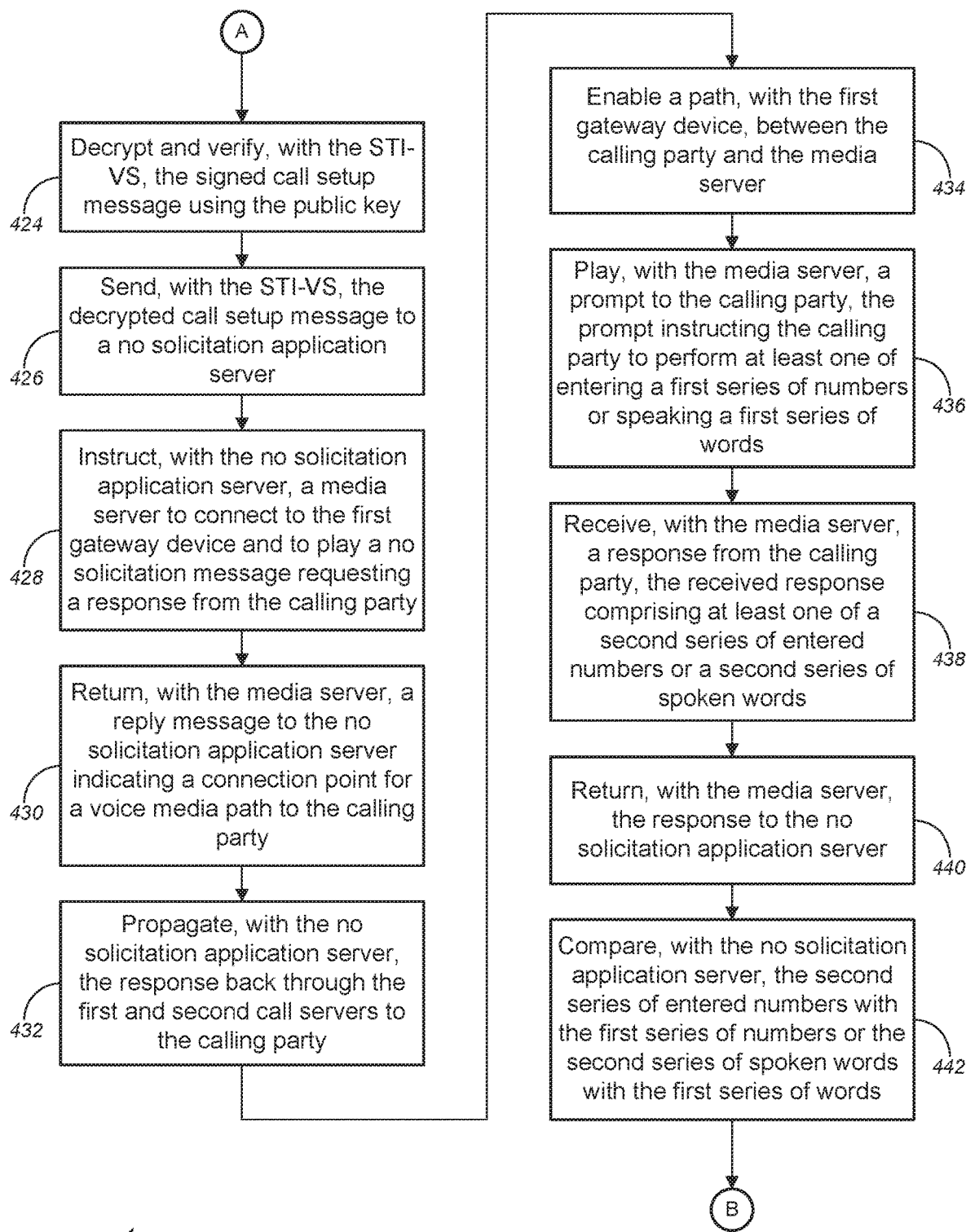
Figure 4C:
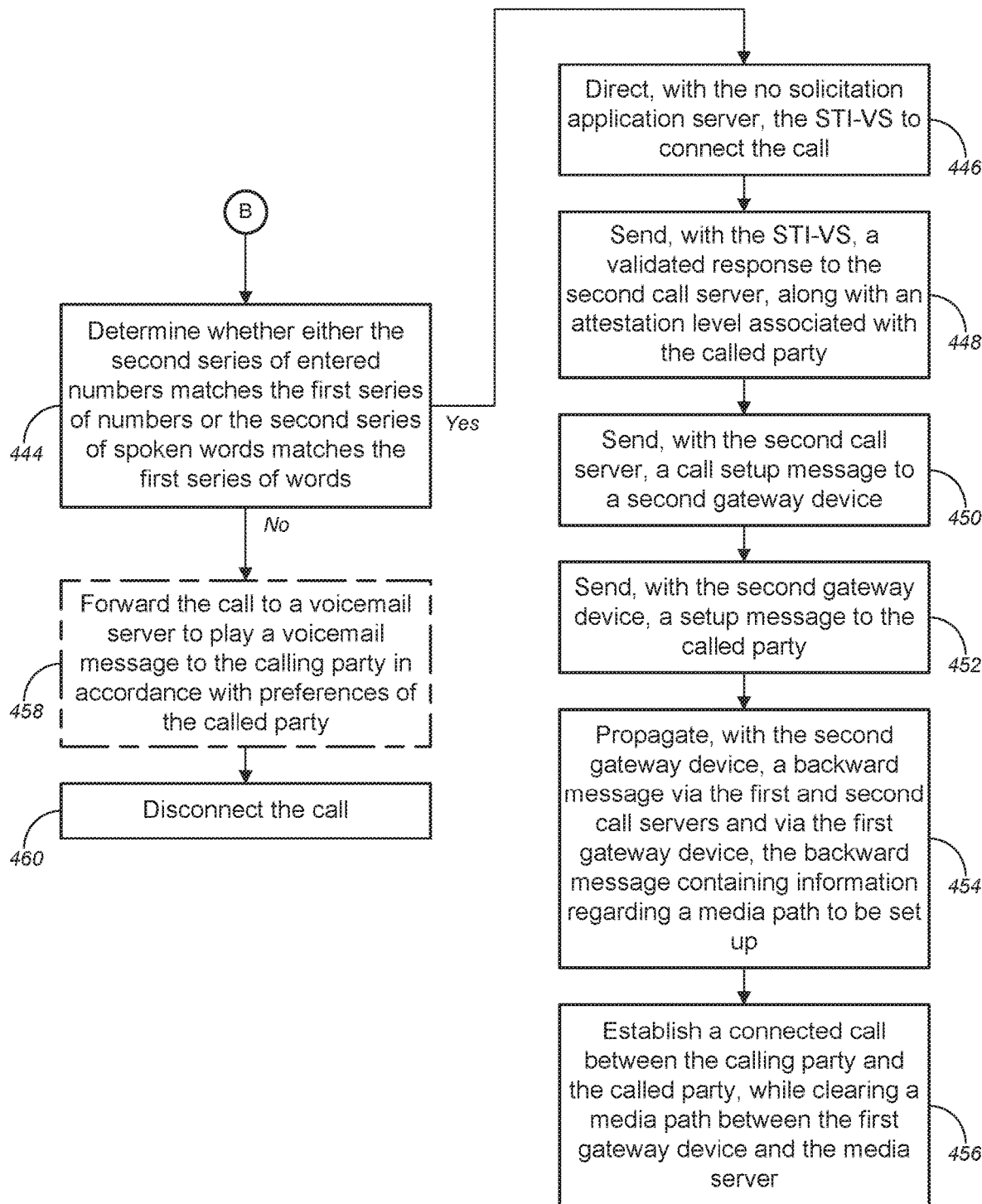

In this manner, calls initiated by robo-callers or the like might be prevented from connecting with the called party, while allowing certain other calls by legitimate calling parties, all based at least in part on determined attestation levels of the calling party and/or on preferences established by the called party, or the like FIGS. 4A-4C (collectively, "FIG. 4") are flow diagrams illustrating a method 400 for implementing telephone solicitation prevention using enhanced VoIP functionalities in conjunction with STIR/SHAKEN protocols, in accordance with various embodiments. Method 400 of FIG. 4A continues onto FIG. 4B following the circular marker denoted, "A," which continues onto FIG. 4C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems or methods 100, 200, and 300 of FIGS. 1, 2, and 3, respectively (or components thereof), such methods may also be implemented using any suitable hardware (or software) implementation. Similarly, while each of the systems or methods 100, 200, and 300 of FIGS. 1, 2, and 3, respectively (or components thereof), can operate according to the method 400 illustrated by FIG. 4 (e.g., by executing instructions embodied on a computer readable medium), the systems or methods 100, 200, and 300 of FIGS. 1, 2, and 3 can each also operate according to other modes of operation and/or perform other suitable procedures.

In the non-limiting embodiment of FIG. 4A, method 400, at block 402, might comprise receiving, with a first gateway device and from a calling party, a request to connect a call with a called party, the request including a called number associated with the called party. At block 404, method 400 might comprise sending, with the first gateway device, a call setup request to a first call server in a first network. Method 400 might further comprise, in response to receiving the call setup request, sending, with the first call server, a signing request (i.e., a request to sign the call setup request) to a secure telephone identity ("STI") authentication server ("AS") (block 406). Method 400 might, at block 408, comprise, in response to receiving the signing request, querying, with the STI-AS, a secure key server ("SKS") for a private key.

At block 410, method 400 might comprise setting, with the STI-AS, an attestation level for the calling party based on one or more attributes associated with the calling party. Method 400 might further comprise, at block 412, creating, with the STI-AS, a signed call setup message using the private key. Method 400 might further comprise returning, with the STI-AS, the signed call setup message to the first call server (block 414). Method 400, at block 416, might comprise, in response to receiving the signed call setup message, selecting, with the first call server, a route through a plurality of call servers to a second call server in a second network, using the called number.

Method 400 might further comprise sending, with the first call server, the signed call setup message to the second call server via the selected route (block 418). At block 420, method 400 might comprise, in response to receiving the signed call setup message, sending, with the second call server, a verification request to a STI verification server ("VS"). Method 400 might further comprise, at block 422, in response to receiving the verification request, querying, with the STI-VS, a certificate repository for a public key, based on information in the verification request. Method 400 might continue onto the process at block 424 in FIG. 4B following the circular marker denoted, "A."

At block 424 in FIG. 4B (following the circular marker denoted, "A"), method 400 might comprise decrypting and verifying, with the STI-VS, the signed call setup message using the public key. Method 400, at block 426, might comprise sending, with the STI-VS, the decrypted call setup message to a no solicitation application server. Method 400 might further comprise instructing, with the no solicitation application server, a media server to connect to the first gateway device and to play a no solicitation message requesting a response from the calling party (block 428); returning, with the media server, a reply message to the no solicitation application server indicating a connection point for a voice media path to the calling party (block 430); propagating, with the no solicitation application server, the response back through the first and second call servers to the calling party (block 432); enabling a path, with the first gateway device, between the calling party and the media server (block 434); and playing, with the media server, a prompt to the calling party, the prompt instructing the calling party to perform at least one of entering a first series of numbers or speaking a first series of words (block 436). At block 438, method 400 might comprise receiving, with the media server, a response from the calling party, the received response comprising at least one of a second series of entered numbers or a second series of spoken words. Method 400, at block 440, might comprise returning, with the media server, the response to the no solicitation application server. Method 400 might further comprise, at block 442, comparing, with the no solicitation application server, the second series of entered numbers with the first series of numbers or the second series of spoken words with the first series of words. Method 400 might continue onto the process at block 444 in FIG. 4C following the circular marker denoted, "B."

At block 444 in FIG. 4C (following the circular marker denoted, "B"), method 400 might comprise determining whether either the second series of entered numbers matches the first series of numbers or the second series of spoken words matches the first series of words. If so, the method proceeds to the process at block 446. If not, the method proceeds to the process at optional block 458.

Based on a determination that either the second series of entered numbers matches the first series of numbers or the second series of spoken words matches the first series of words, method 400 might comprise: directing, with the no solicitation application server, the STI-VS to connect the call (block 446); sending, with the STI-VS, a validated response to the second call server, along with an attestation level associated with the called party (block 448); sending, with the second call server, a call setup message to a second gateway device (block 450); sending, with the second gateway device, a setup message to the called party (block 452); propagating, with the second gateway device, a backward message via the first and second call servers and via the first gateway device, the backward message containing information regarding a media path to be set up (block 454); and establishing a connected call between the calling party and the called party, while clearing a media path between the first gateway device and the media server (block 456).

On the other hand, based on a determination that either the second series of entered numbers fails to match the first series of numbers or the second series of spoken words fails to match the first series of words, method 400 might comprise: forwarding the call to a voicemail server to play a voicemail message to the calling party in accordance with preferences of the called party (optional block 458); and disconnecting the call (block 460).

FIGS. 5A-5D (collectively, "FIG. 5") are flow diagrams illustrating another method 500 for implementing telephone solicitation prevention using enhanced VoIP functionalities in conjunction with STIR/SHAKEN protocols, in accordance with various embodiments. Method 500 of FIG. 5A continues onto FIG. 5B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems or methods 100, 200, and 300 of FIGS. 1, 2, and 3, respectively (or components thereof), such methods may also be implemented using any suitable hardware (or software) implementation. Similarly, while each of the systems or methods 100, 200, and 300 of FIGS. 1, 2, and 3, respectively (or components thereof), can operate according to the method 500 illustrated by FIG. 5 (e.g., by executing instructions embodied on a computer readable medium), the systems or methods 100, 200, and 300 of FIGS. 1, 2, and 3 can each also operate according to other modes of operation and/or perform other suitable procedures.

Figure 5A:
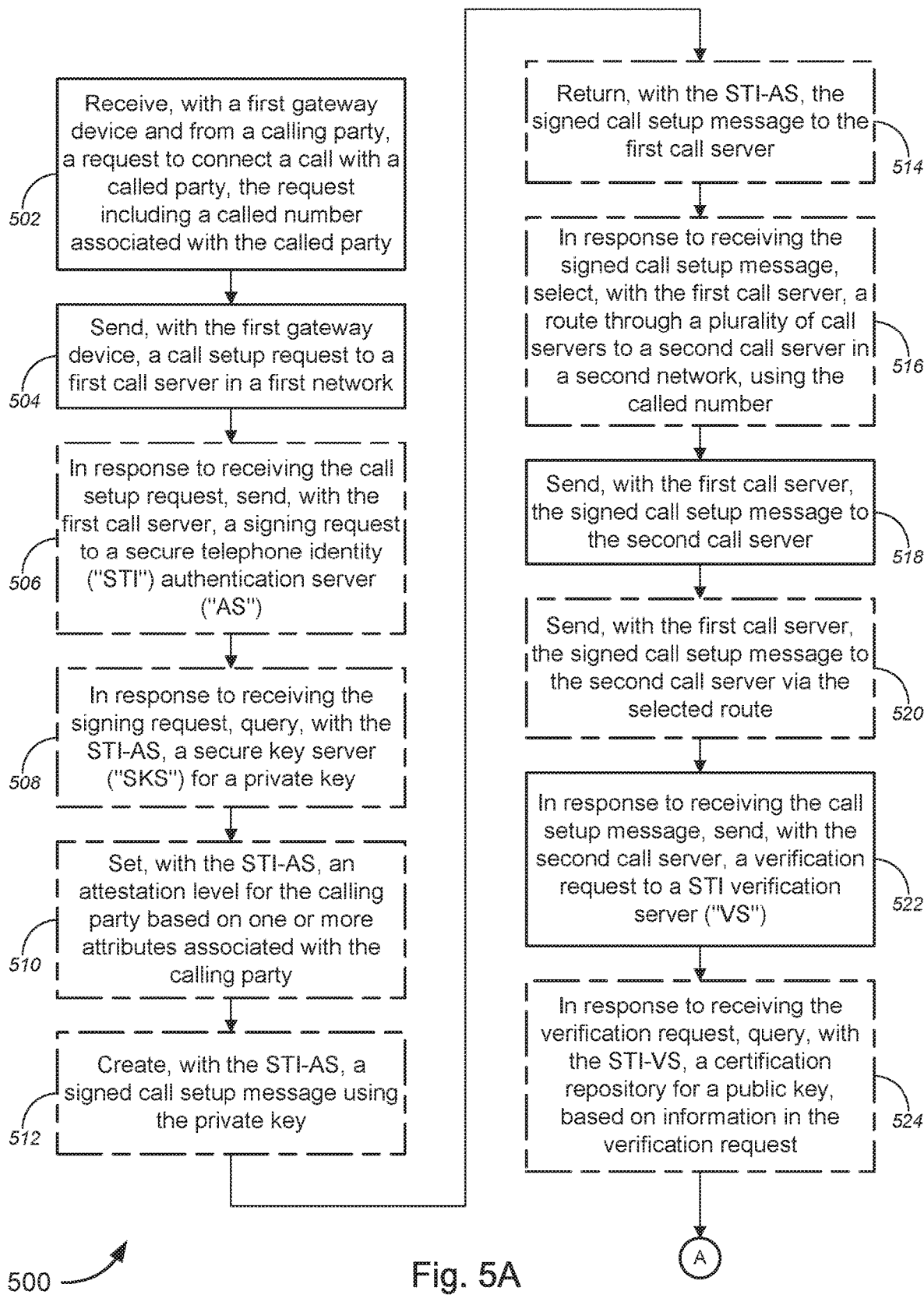
FIGS. 5A-5D are flow diagrams illustrating another method for implementing telephone solicitation prevention using enhanced VoIP functionalities in conjunction with STIR/SHAKEN protocols, in accordance with various embodiments.

In the non-limiting embodiment of FIG. 5A, method 500, at block 502, might comprise receiving, with a first gateway device and from a calling party, a request to connect a call with a called party, the request including a called number associated with the called party. At block 504, method 500 might comprise sending, with the first gateway device, a call setup request to a first call server in a first network. Method 500 might further comprise, in response to receiving the call setup request, sending, with the first call server, a signing request to a secure telephone identity ("STI") authentication server ("AS") (optional block 506). Method 500 might, at optional block 508, comprise, in response to receiving the signing request, querying, with the STI-AS, a secure key server ("SKS") for a private key.

At optional block 510, method 500 might comprise setting, with the STI-AS, an attestation level for the calling party based on one or more attributes associated with the calling party. Method 500 might further comprise, at optional block 512, creating, with the STI-AS, a signed call setup message using the private key. Method 500 might further comprise returning, with the STI-AS, the signed call setup message to the first call server (optional block 514). Method 500, at optional block 516, might comprise, in response to receiving the signed call setup message, selecting, with the first call server, a route through a plurality of call servers to a second call server in a second network, using the called number.

Method 500 might further comprise sending, with the first call server, the signed call setup message to the second call server (block 518). Method 500, at optional block 520, might comprise sending, with the first call server, the signed call setup message to the second call server via the selected route. At block 522, method 500 might comprise, in response to receiving the call setup message, sending, with the second call server, a verification request to a STI verification server ("VS"). Method 500 might further comprise, at optional block 524, in response to receiving the verification request, querying, with the STI-VS, a certificate repository for a public key, based on information in the verification request. Method 500 might continue onto the process at block 526 in FIG. 5B following the circular marker denoted, "A."

Figure 5B:
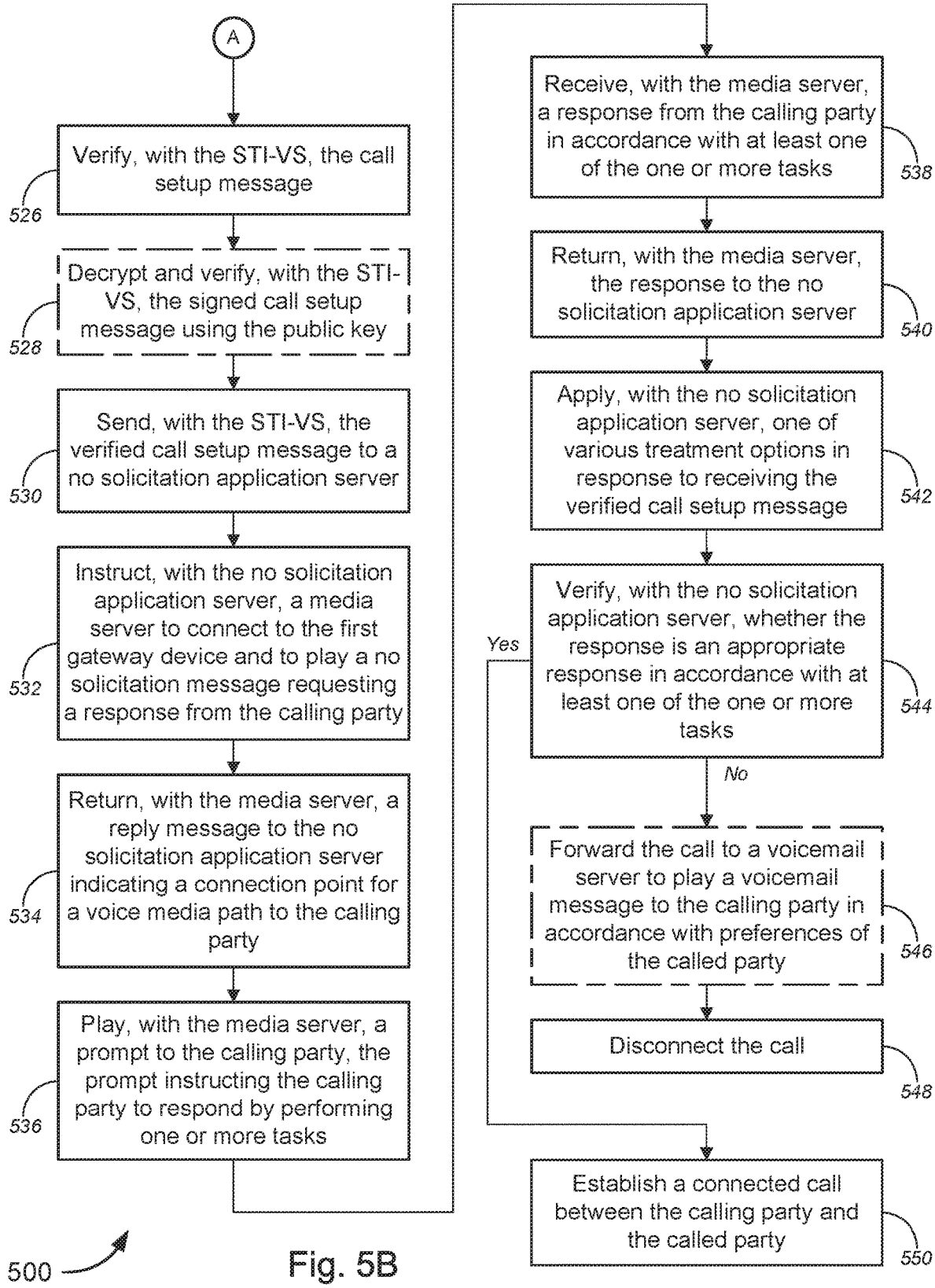

At block 526 in FIG. 5B (following the circular marker denoted, "A"), method 500 might comprise verifying, with the STI-VS, the call setup message. In some cases, verifying, with the STI-VS, the call setup message might comprise decrypting and verifying, with the STI-VS, the signed call setup message using the public key (optional block 528). Method 500, at block 530, might comprise sending, with the STI-VS, the verified call setup message to a no solicitation application server. Method 500 might further comprise instructing, with the no solicitation application server, a media server to connect to the first gateway device and to play a no solicitation message requesting a response from the calling party (block 532); returning, with the media server, a reply message to the no solicitation application server indicating a connection point for a voice media path to the calling party (block 534); and playing, with the media server, a prompt to the calling party, the prompt instructing the calling party to respond by performing one or more tasks (block 536). At block 538, method 500 might comprise receiving, with the media server, a response from the calling party in accordance with at least one of the one or more tasks. Method 500, at block 540, might comprise returning, with the media server, the response to the no solicitation application server. Method 500 might further comprise, at block 542, applying, with the no solicitation application server, one of various treatment options in response to receiving the verified call setup message. Method 500 might further comprise verifying, with the no solicitation application server, whether the response is an appropriate response in accordance with at least one of the one or more tasks (block 544). If not, the method proceeds to the process at optional block 546. If so, the method proceeds to the process at block 550. At optional block 546, based on a determination that the response is not an appropriate response, method 500 might comprise: forwarding the call to a voicemail server to play a voicemail message to the calling party in accordance with preferences of the called party (optional block 546); and disconnecting the call (block 548). At block 550, based on a determination that the response has been verified to be an appropriate response, method 500 might comprise establishing a connected call between the calling party and the called party.

Figure 5C:
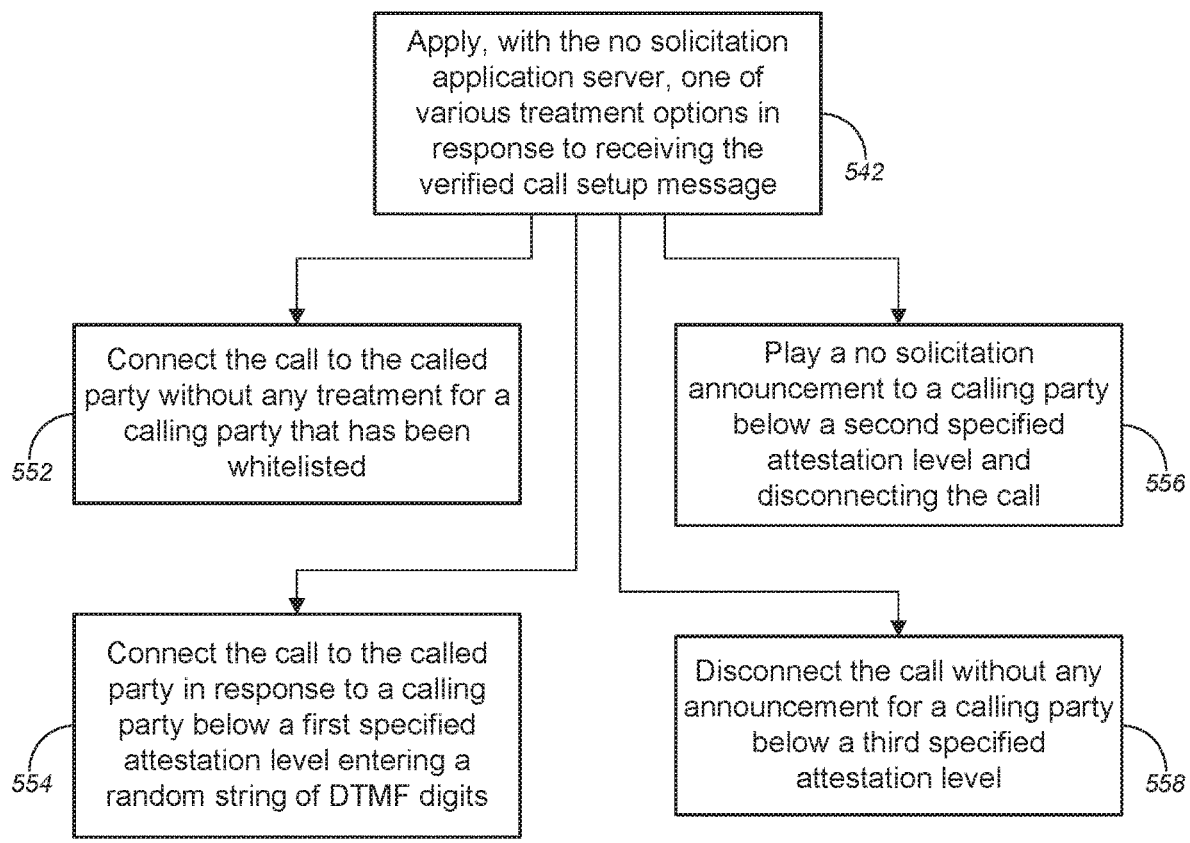

With reference to FIG. 5C, applying, with the no solicitation application server, one of various treatment options in response to receiving the verified call setup message (at block 542) might comprise at least one of: connecting the call to the called party without any treatment for a calling party that has been whitelisted (block 552); connecting the call to the called party in response to a calling party below a first specified attestation level entering a random string of DTMF digits (block 554); playing a no solicitation announcement to a calling party below a second specified attestation level and disconnecting the call (block 556); or disconnecting the call without any announcement for a calling party below a third specified attestation level (block 558); and/or the like.

Figure 5D:
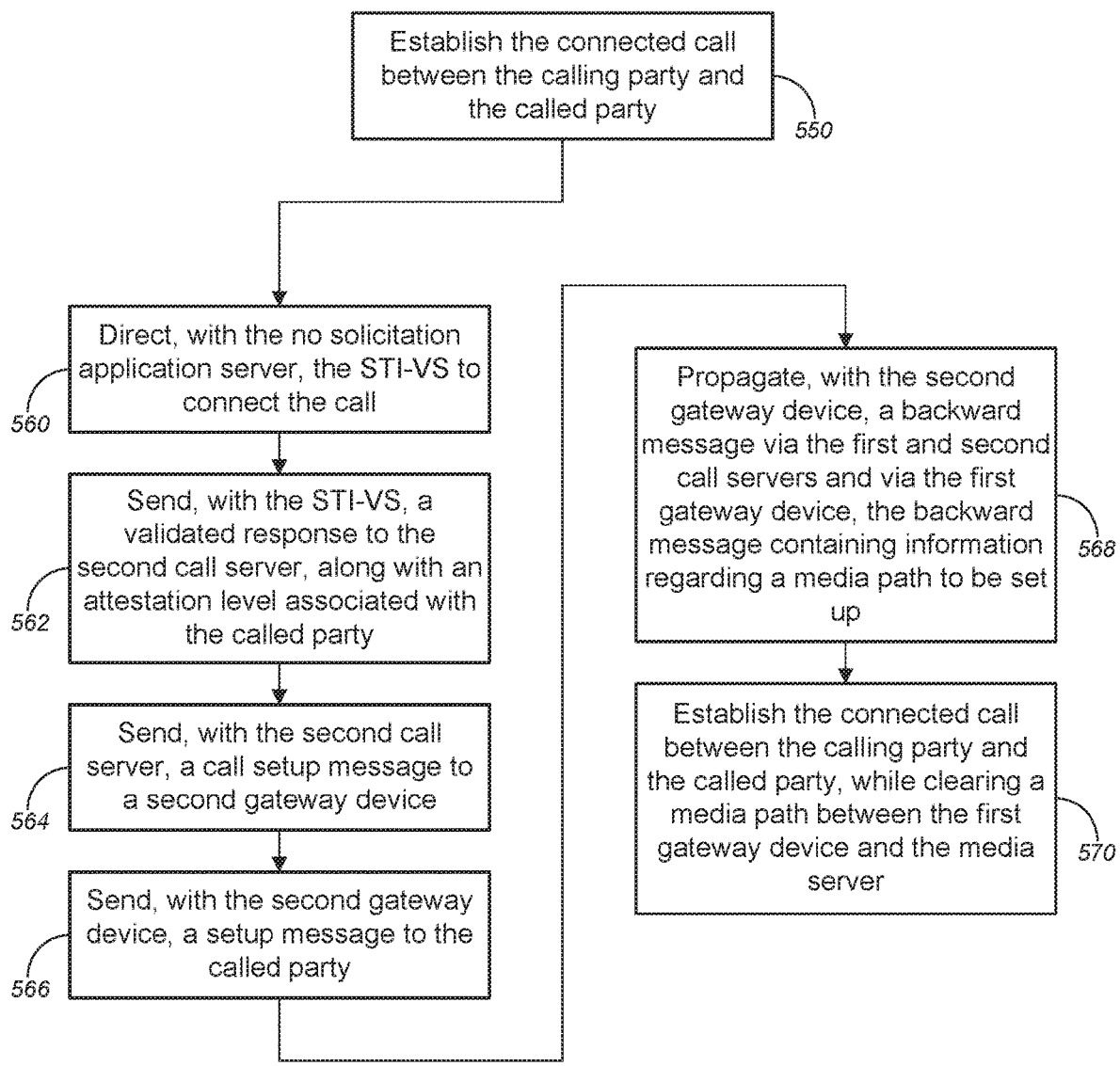

Referring to FIG. 5D, establishing the connected call between the calling party and the called party (at block 550) might comprise: directing, with the no solicitation application server, the STI-VS to connect the call (block 560); sending, with the STI-VS, a validated response to the second call server, along with an attestation level associated with the called party (block 562); sending, with the second call server, a call setup message to a second gateway device (block 564); sending, with the second gateway device, a setup message to the called party (block 566); propagating, with the second gateway device, a backward message via the first and second call servers and via the first gateway device, the backward message containing information regarding a media path to be set up (block 568); and establishing the connected call between the calling party and the called party, while clearing a media path between the first gateway device and the media server (block 570).

In some aspects, various embodiments might implement validation of telephone number assignment using a universally unique identifier to telephone number database query, as described below with respect to FIG. 6 through 8. In some cases, a voice network or voice network control device might determine if an originating telephone number ("TN") associated with a call or session is specifically assigned to an originator of the call or session. The voice network or voice network control device might check the relationship between a universally unique identifier ("UUID") associated with a network interface or registrant and the originating TN delivered with the call in a UUID to TN relation database. If the UUID to TN relation is valid, the voice network or voice network control device might provide for marking of the call setup signaling message to indicate that the relation is valid. If no direct association is available between the UUID and TN in the database, the TN for the call may be marked as "Validation Failed" or "No Validation Performed" depending on the circumstance of the validation check.

In operation, the network operator might assign a UUID to an originating interface or registrant via a manual process or automated process. The interface may be defined as a physical port or circuit, a trunk group, an Internet protocol ("IP") address, or other method of defining an interface and may be defined as a combination of any of the elements.

A UUID may also be assigned to at least one of a customer, a grouping of TNs associated with a customer, a tenant, or an enterprise, and/or the like. These customers or groupings may be identified through automated registration of phones or devices to the network or network device, or through a database entry to the network systems.

The originating device in the network may be one of a call server ("CS"), a call session control function ("CSCF"), a soft switch ("SS"), a session border controller ("SBC"), a voice gateway, a voice application server, or a telephony application server ("TAS"), and/or the like. A UUID to TN database might be provisioned with association of TNs assigned to specific UUIDs. This assignment may be based on a voice carrier assigning specific TNs to a customer whereby the customer is associated with a specific UUID or multiple UUIDs. UUID to TN relationships may be many to many relationships where a UUID may have multiple TNs assigned and a TN may be assigned to multiple UUIDs. In the case of an enterprise, for example, the enterprise may originate calls with the same TN on multiple trunk groups.

Call Procedure:

A user element ("UE") might send a setup or call request to the network origination device. A UE may be defined as one of a telephone, a VoIP PBX, a traditional TDM voice PBX, a VoIP soft client, a Facsimile ("FAX") machine, or a voice origination device, and/or the like.

The network origination device might associate the UUID with the call setup. This UUID might be the one assigned to the network interface for this UE, or, for a registered UE, assigned to the registrant, as described above.

The originating device may query a UUID to TN database to determine if the calling or originating TN sent by the UE is assigned by the carrier to the UE owner. The query may contain the UUID and the calling TN. The query may also contain other information, including, but not limited to, originating time stamps, called number, querying element identification, or other pertinent information, and/or the like.

The UUID to TN database might check the UUID to TN association. If the TN is associated to the UUID within the database, then the database might respond to the query with an indication that the TN is verified or that the TN Validation Passed. If the UUID to TN database check does not find an association between the calling TN and the UUID, the database may return a response with an indication that the TN Failed Validation or that TN Validation was not performed.

This method may also be associated with STIR/SHAKEN methods of setting Attestation levels. Attestation levels might be as defined by ATIS in ATIS-1000074 STIR/SHAKEN framework: JOINT ATIS/SIP FORUM STANDARD—SIGNATURE-BASED HANDLING OF ASSERTED INFORMATION USING TOKENS (SHAKEN), or the like.

In some cases, the attestation level for the calling party (such as defined in ATIS-1000074, or the like) might comprise one of full attestation level [Attestation level A], partial attestation level [Attestation level B], or gateway attestation level [Attestation level C], and/or the like. The full attestation level [Attestation level A] might require that a signing service provider is responsible for origination of a call, that the signing service provider has a direct authenticated relationship with the calling party and can identify the calling party, and that the signing service provider has established a verified association with an originating telephone number used by the calling party to request to connect the call with the called party. The partial attestation level [Attestation level B] might require that the signing service provider is responsible for origination of a call, that the signing service provider has a direct authenticated relationship with the calling party and can identify the calling party, and that the signing service provider has not established a verified association with an originating telephone number used by the calling party to request to connect the call with the called party. The gateway attestation level [Attestation level C] might require that the signing service provider has control over an entry point of a call into a network and that the signing service provider has no relationship with the originator of a call.

The database may set Attestation A (or Attestation level A) if the UUID and TN relationship is found in the UUID to TN database. The database or originating carrier network or network system may set Attestation B (or Attestation level B) or Attestation C (or Attestation level C) if the UUID and TN relationship is not found in the UUID to TN database.

The database or originating carrier network may use additional elements defined in the UUID to TN database or in the originating carrier network call processing systems to distinguish a call attestation decision and might set Attestation B or Attestation C. This may be done by additional attribution in the UUID to TN database indicating a UUID interface type. The UUID interface type may indicate that the UUID meets Attestation B when the originating TN is not associated with this UUID. The UUID interface type may indicate that the UUID meets Attestation C when the TN is not associated with this specific UUID.

The originating carrier network systems may include indication in the outgoing setup messaging stating Attestation level or TN Validation status.

These and/or other aspects of the implementation of the validation of telephone number assignment using a universally unique identifier to telephone number database query are described below with respect to FIG. 6 through 8.

Figure 6:
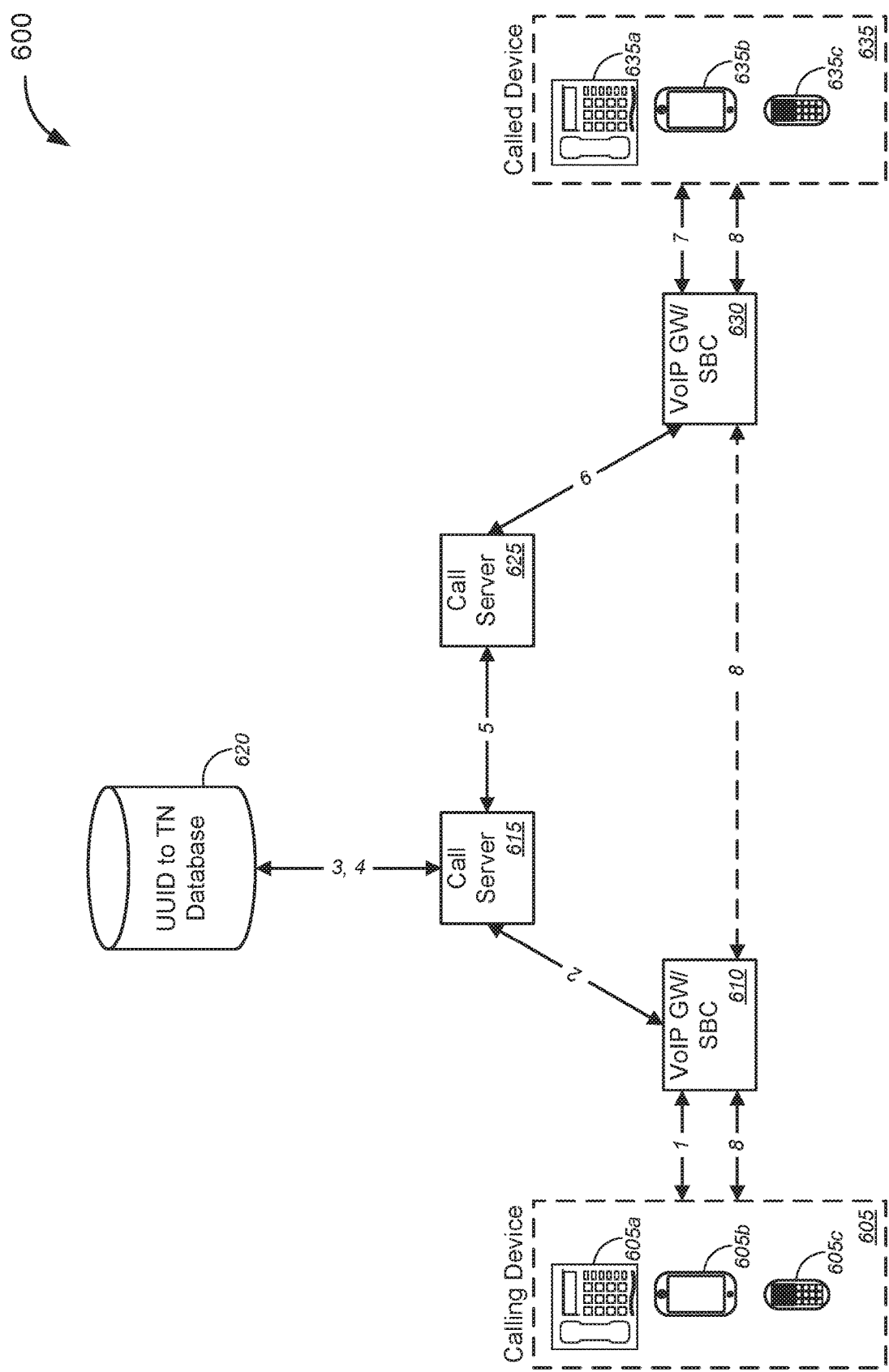
FIG. 6 is a schematic block diagram illustrating a method for implementing validation of telephone number assignment using a universally unique identifier to telephone number database query, in accordance with various embodiments.

FIG. 6 is a schematic block diagram illustrating a method 600 for implementing validation of telephone number assignment using a universally unique identifier to telephone number database query, in accordance with various embodiments.

In the non-limiting embodiment of method 600 of FIG. 6, an originating caller or calling party might place a call via an originating user element ("UE") or calling device 605 (which might include, without limitation, a telephone 605a, a smart phone 605b, or a mobile phone 605c, and/or the like) to a called party at a called device (which might include, without limitation, a telephone 635a, a smart phone 635b, or a mobile phone 635c, and/or the like), using a called number. At step 1, the originating UE 605 might send a call setup request to an originating gateway or a first gateway device 610 (which might include, without limitation, a voice over Internet protocol ("VoIP") gateway, a session border controller ("SBC"), and/or the like). At step 2, the originating gateway 610 might send an originating call request or call setup request to an originating call server or first call server ("CS") 615. The call request may contain a universally unique identifier ("UUID") associated with the originating network interface. At step 3, the originating CS 615 may check to determine if the UUID is provided in the call request. If the UUID is not provided, the CS 615 may check to see if a database 620, such as a UUID to TN database, or the like (which might be a database associated with the CS 615 or a database that is unrelated to the CS 615, or the like), contains a UUID for the interface or customer of the call. The CS 615 might send a UUID to TN validation request query to the UUID to TN database 620. The query might contain, at a minimum, the UUID and originating TN for this call. At step 4, the UUID to TN database 620 might check to determine whether the UUID has a direct assignment relationship with the originating TN. The UUID to TN database 620 might return a response to the CS 615 with the appropriately determined verification status or attestation level.

At step 5, the originating CS 615 might send a setup message to the terminating CS 625. The setup message might contain the UUID or origination ID, the calling TN, and the verification status and attestation level provided by the UUID to TN database 620. At step 6, the terminating CS 625 might receive the call setup request and might perform the terminating process, by sending a call setup message to a terminating or second gateway device 630 (which might include, without limitation, a voice over Internet protocol ("VoIP") gateway, a session border controller ("SBC"), and/or the like). This process may include call treatments to indicate to the terminating customer the verification status or attestation level as received in the setup. At step 7, the terminating or second gateway device 630 might send a setup message to the called party at the called device 635. At step 8, a connected call might be established between the calling party at the calling device 605 and the called party at the called device 635.

Figure 7A:
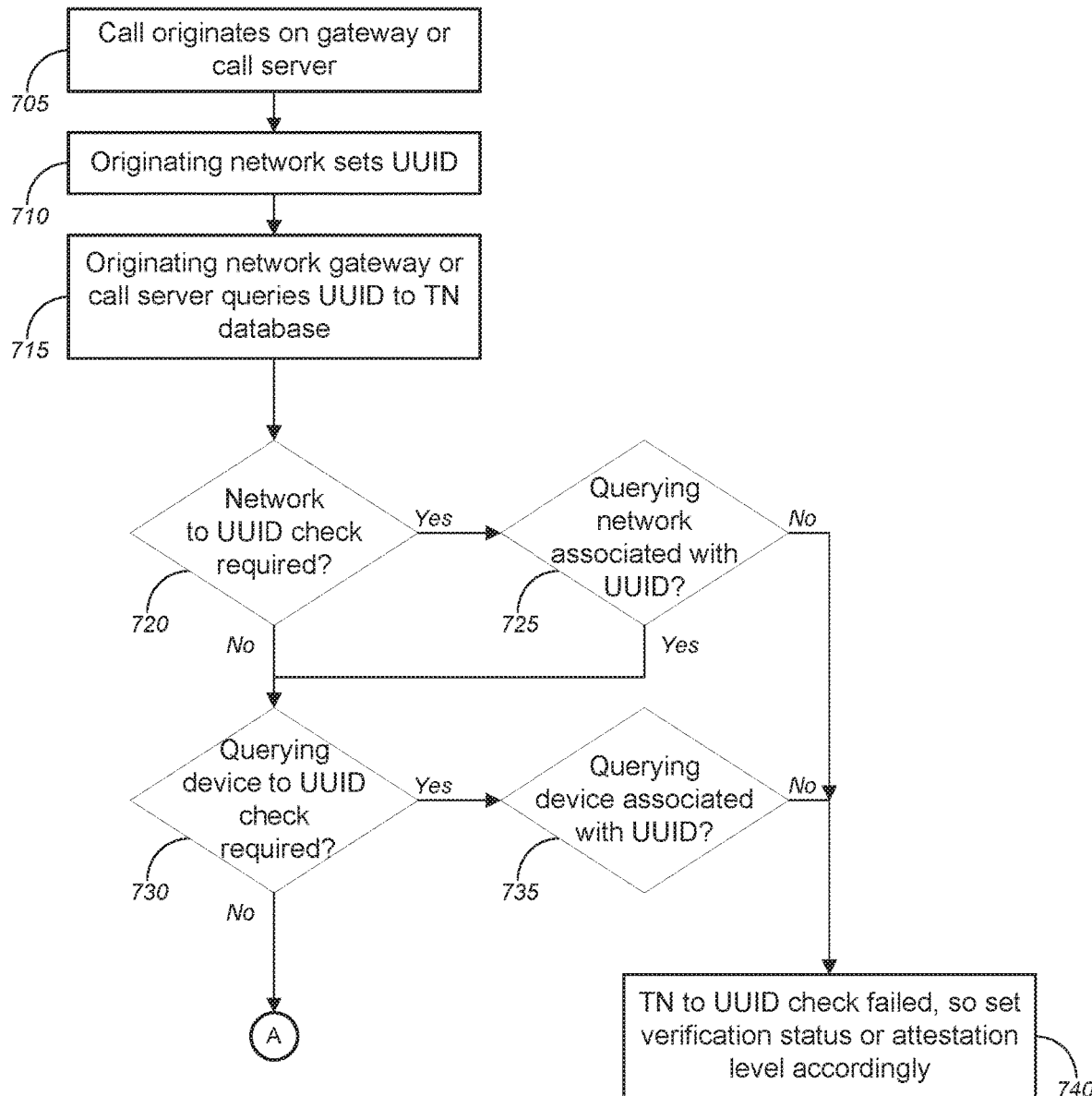
FIGS. 7A and 7B are flow diagrams illustrating a method for implementing validation of telephone number assignment using a universally unique identifier to telephone number database query, in accordance with various embodiments.
Figure 7B:
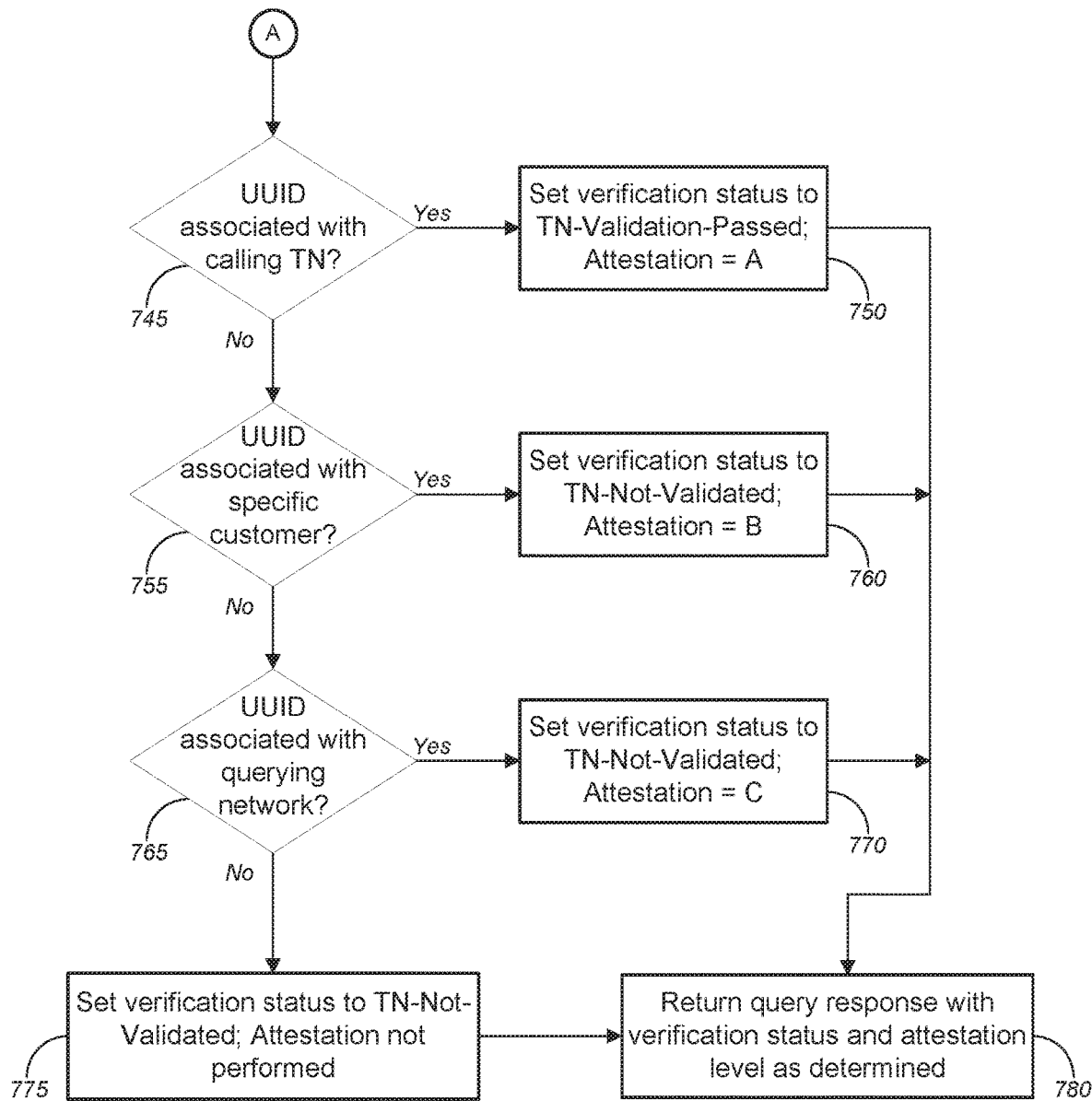

FIGS. 7A and 7B (collectively, "FIG. 7") are flow diagrams illustrating a high-level logic flow 700 to check for a UUID to TN association during implementation of validation of telephone number assignment using a universally unique identifier to telephone number database query, in accordance with various embodiments. Logic flow 700 of FIG. 7A continues onto FIG. 7B following the circular marker denoted, "A."

In the non-limiting embodiment of FIG. 7A, at block 705, a call might originate on a gateway or call server. At block 710, the originating network (in some embodiments, the gateway or the call server, specifically, or the like) might set a universally unique identifier ("UUID") associated with the originating network interface. At block 715, the originating network gateway or call server might query a UUID to telephone number ("TN") database. At block 720, the UUID to TN database might determine whether a network to UUID check is required. If so, the process might continue to block 725. If not, the process might skip to block 730. At block 725, the UUID to TN database might determine whether the querying network is associated with the UUID. If so, the process might continue to block 730. If not, the process might skip to block 740. At block 730, the UUID to TN database might determine whether a querying device to UUID check is required. If so, the process might continue to block 735. If not, the process might skip to block 745 in FIG. 7B following the circular marker denoted, "A." At block 735, the UUID to TN database might determine whether the querying device is associated with the UUID. If not, the process might proceed to block 740. At block 740, the TN to UUID has been determined to have failed, and so a verification status and/or attestation level might be set accordingly.

At block 745 in FIG. 7B (following the circular marker denoted, "A"), the UUID to TN database might determine whether the UUID is associated with the calling TN. If so, the process might continue to block 750. If not, the process might skip to block 755. At block 750, the verification status is set to "TN-Validation-Passed" and the attestation level is set to level A. Subsequently, the process might skip to the process at block 780. At block 755, the UUID to TN database might determine whether the UUID is associated with a specific customer. If so, the process might continue to block 760. If not, the process might skip to block 765. At block 760, the verification status is set to "TN-Not-Validated" and the attestation level is set to level B. Subsequently, the process might skip to the process at block 780. At block 765, the UUID to TN database might determine whether the UUID is associated with the querying network. If so, the process might continue to block 770. If not, the process might skip to block 775. At block 770, the verification status is set to "TN-Not-Validated" and the attestation level is set to level C. Subsequently, the process might skip to the process at block 780. At block 775, the verification status is set to "TN-Not-Validated" and the attestation is not performed. At block 780, the query response might be returned with verification status and attestation as determined.

FIG. 8 is a flow diagram illustrating a method 800 for implementing validation of telephone number assignment using a universally unique identifier to telephone number database query, in accordance with various embodiments.

While the techniques and procedures are depicted and/or described in a certain order for purposes of illustration, it should be appreciated that certain procedures may be reordered and/or omitted within the scope of various embodiments. Moreover, while the method 800 illustrated by FIG. 8 can be implemented by or with (and, in some cases, are described below with respect to) the method or logic flow 600 and 700 of FIGS. 6 and 7, respectively (or components thereof), such methods may also be implemented using any suitable hardware (or software) implementation. Similarly, while each of the method or logic flow 600 and 700 of FIGS. 6 and 7, respectively (or components thereof), can operate according to the method 800 illustrated by FIG. 8 (e.g., by executing instructions embodied on a computer readable medium), the method or logic flow 600 and 700 of FIGS. 6 and 7 can each also operate according to other modes of operation and/or perform other suitable procedures.

In the non-limiting embodiment of FIG. 8, method 800, at block 805, might comprise receiving, with a first gateway device and from a calling party, a request to connect a call with a called party, the request including a called number associated with the called party. At block 810, method 800 might comprise sending, with the first gateway device, a call setup request to a first call server in a first network. Method 800 might further comprise determining, with the first call server, whether the call setup request contains a universally unique identifier ("UUID") associated with an originating network interface that corresponds to a calling device associated with the calling party (block 815); based on a determination that the call setup request does not contain a UUID associated with the originating network interface, querying, with the first call server, whether a database, which is communicatively coupled to the first call server, contains the UUID associated with the originating network interface, wherein the query contains the UUID and a calling number associated with the calling party (block 820); and sending, with the first call server, a UUID to telephone number ("TN") validation request to a UUID to TN database (block 825).

Method 800 might further comprise determining, with the UUID to TN database, whether the UUID has a direct assignment relationship with the calling number (block 830); determining, with the UUID to TN database, at least one of a verification status or an attestation level, based at least in part on the determined relationship between the UUID and the calling number (block 835); and sending, with the UUID to TN database and to the first call server, a response containing the determined at least one of the verification status or the attestation level (block 840).

At block 845, method 800 might comprise sending, with the first call server, a setup message to a second call server, wherein the setup message contains the UUID, the calling TN, or the determined at least one of the verification status or the attestation level. Method 800 might further comprise, at block 850, based at least in part on one or more of the UUID or the determined at least one of the verification status or the attestation level, applying, with the second call server, one of various treatment options related to the call.

In some embodiments, the various treatment options might include, without limitation, at least one of: connecting the call to the called party without any treatment for the highest level of verification status or attestation level; applying a first preestablished treatment option below a first specified level of verification status or attestation level; applying a second preestablished treatment option below a second specified level of verification status or attestation level; or disconnecting the call without any announcement below a third specified level of verification status or attestation level; and/or the like.

According to some embodiments, the originating network interface might include, but is not limited to, at least one of a physical port, a logical port, a physical circuit, a physical trunk group, a logical trunk group, or an Internet protocol ("IP") address, and/or the like. In some cases, the calling device associated with the calling party might include, without limitation, at least one of a telephone, a voice over Internet protocol ("VoIP") private branch exchange ("PBX"), a time-division multiplexing ("TDM") voice PBX, a VoIP soft client, a facsimile machine, or a voice origination device, and/or the like. In some instances, the database and the UUID to TN database might be the same database. According to some embodiments, the UUID might be assigned to a group of users (such as a company or the like), wherein each user within the group of users shares the same UUID. In some cases, the query to the database might further comprise at least one of one or more originating time stamps, the called number, or a querying element identification, and/or the like.

In some embodiments, the attestation level for the calling party might include, without limitation, one of full attestation level, partial attestation level, or gateway attestation level, and/or the like. The full attestation level might require that a signing service provider is responsible for origination of a call, that the signing service provider has a direct authenticated relationship with the calling party and can identify the calling party, and that the signing service provider has established a verified association with the calling number used by the calling party to request to connect the call with the called party. The partial attestation level might require that the signing service provider is responsible for origination of a call, that the signing service provider has a direct authenticated relationship with the calling party and can identify the calling party, and that the signing service provider has not established a verified association with the calling number used by the calling party to request to connect the call with the called party. The gateway attestation level might require that the signing service provider has control over an entry point of a call into a network and that the signing service provider has no relationship with the originator of a call.

According to some embodiments, the called party might be provided with options to set a preferred level of treatment for the second call server to implement in response to receiving the setup message, wherein the options might include, but are not limited to, at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls, and/or the like.

In some aspects, even if not specifically described above with respect to FIGS. 1-8 above, elements of the embodiments of FIGS. 1-5 may be combined with elements of the embodiments of FIGS. 6-8, and vice versa, to implement telephone solicitation prevention using a combination of telephone solicitation prevention using enhanced VoIP functionalities in conjunction with STIR/SHAKEN protocols and validation of telephone number assignment using a UUID to TN database query.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a first gateway device and from a calling party, a request to connect a call with a called party, the request including a called number associated with the called party;
sending, with the first gateway device, a call setup request to a first call server in a first network;
in response to receiving the call setup request, sending, with the first call server, a signing request to a secure telephone identity ("STI") authentication server ("AS");
in response to receiving the signing request, querying, with the STI-AS, a secure key server ("SKS") for a private key;
setting, with the STI-AS, an attestation level for the calling party based on one or more attributes associated with the calling party;
creating, with the STI-AS, a signed call setup message using the private key;
returning, with the STI-AS, the signed call setup message to the first call server;
in response to receiving the signed call setup message, selecting, with the first call server, a route through a plurality of call servers to a second call server in a second network, using the called number;
sending, with the first call server, the signed call setup message to the second call server via the selected route;
in response to receiving the signed call setup message, sending, with the second call server, a verification request to a STI verification server ("VS");
in response to receiving the verification request, querying, with the STI-VS, a certificate repository for a public key, based on information in the verification request;
decrypting and verifying, with the STI-VS, the signed call setup message using the public key;
sending, with the STI-VS, the decrypted call setup message to a no solicitation application server;
instructing, with the no solicitation application server, a media server to connect to the first gateway device and to play a no solicitation message requesting a response from the calling party;
returning, with the media server, a reply message to the no solicitation application server indicating a connection point for a voice media path to the calling party;
propagating, with the no solicitation application server, the response back through the first and second call servers to the calling party;
enabling a path, with the first gateway device, between the calling party and the media server;
playing, with the media server, a prompt to the calling party, the prompt instructing the calling party to perform at least one of entering a first series of numbers or speaking a first series of words;
receiving, with the media server, a response from the calling party, the received response comprising at least one of a second series of entered numbers or a second series of spoken words;
returning, with the media server, the response to the no solicitation application server;
comparing, with the no solicitation application server, the second series of entered numbers with the first series of numbers or the second series of spoken words with the first series of words;

based on a determination that either the second series of entered numbers matches the first series of numbers or the second series of spoken words matches the first series of words, performing the following:
  directing, with the no solicitation application server, the STI-VS to connect the call;
  sending, with the STI-VS, a validated response to the second call server, along with an attestation level associated with the called party;
  sending, with the second call server, a call setup message to a second gateway device;
  sending, with the second gateway device, a setup message to the called party;
  propagating, with the second gateway device, a backward message via the first and second call servers and via the first gateway device, the backward message containing information regarding a media path to be set up; and
  establishing a connected call between the calling party and the called party, while clearing a media path between the first gateway device and the media server;
based on a determination that either the second series of entered numbers fails to match the first series of numbers or the second series of spoken words fails to match the first series of words, performing one of:
  disconnecting the call; or
  forwarding the call to a voicemail server to play a voicemail message to the calling party in accordance with preferences of the called party, prior to disconnecting the call.

2. A method, comprising:
receiving, with a first gateway device and from a calling party, a request to connect a call with a called party, the request including a called number associated with the called party;
sending, with the first gateway device, a call setup request to a first call server in a first network;
in response to receiving the call setup request, sending, with the first call server, a call setup message to a second call server in a second network;
in response to receiving the call setup message, sending, with the second call server, a verification request to a secure telephone identity ("STI") verification server ("VS");
in response to receiving the verification request, verifying, with the STI-VS, the call setup message;
sending, with the STI-VS, the verified call setup message to a no solicitation application server;
in response to receiving the verified call setup, instructing, with the no solicitation application server, a media server to connect to the first gateway device and to play a no solicitation message requesting a response from the calling party;
returning, with the media server, a reply message to the no solicitation application server indicating a connection point for a voice media path to the calling party;
playing, with the media server, a prompt to the calling party, the prompt instructing the calling party to respond by performing one or more tasks;
receiving, with the media server, a response from the calling party in accordance with at least one of the one or more tasks;
returning, with the media server, the response to the no solicitation application server;
verifying, with the no solicitation application server, whether the response is an appropriate response in accordance with at least one of the one or more tasks;
based on a determination that the response has been verified to be an appropriate response, establishing a connected call between the calling party and the called party; and
based on a determination that the response is not an appropriate response, performing one of:
  disconnecting the call; or
  forwarding the call to a voicemail server to play a voicemail message to the calling party in accordance with preferences of the called party, prior to disconnecting the call.

3. The method of claim 2, further comprising:
in response to receiving the call setup request, sending, with the first call server, a signing request to a STI authentication server ("AS");
in response to receiving the signing request, querying, with the STI-AS, a secure key server ("SKS") for a private key;
setting, with the STI-AS, an attestation level for the calling party based on one or more attributes associated with the calling party;
creating, with the STI-AS, a signed call setup message using the private key;
returning, with the STI-AS, the signed call setup message to the first call server; and
in response to receiving the signed call setup message, selecting, with the first call server, a route through a plurality of call servers to a second call server in a second network, using the called number;
wherein sending the call setup message to the second call server comprises sending, with the first call server, the call setup message to the second call server via the selected route.

4. The method of claim 3, further comprising:
in response to receiving the verification request, querying, with the STI-VS, a certificate repository for a public key, based on information in the verification request;
wherein verifying the call setup message comprises decrypting and verifying, with the STI-VS, the signed call setup message using the public key.

5. The method of claim 3, wherein the attestation level for the calling party comprises one of full attestation level, partial attestation level, or gateway attestation level, wherein the full attestation level requires that a signing service provider is responsible for origination of a call, that the signing service provider has a direct authenticated relationship with the calling party and can identify the calling party, and that the signing service provider has established a verified association with an originating telephone number used by the calling party to request to connect the call with the called party, wherein the partial attestation level requires that the signing service provider is responsible for origination of a call, that the signing service provider has a direct authenticated relationship with the calling party and can identify the calling party, and that the signing service provider has not established a verified association with an originating telephone number used by the calling party to request to connect the call with the called party, wherein the gateway attestation level requires that the signing service provider has control over an entry point of a call into a network and that the signing service provider has no relationship with the originator of a call.

6. The method of claim 3, further comprising:
applying, with the no solicitation application server, one of various treatment options in response to receiving the verified call setup message, wherein the various treatment options comprises at least one of:
connecting the call to the called party without any treatment for a calling party that has been whitelisted;
connecting the call to the called party in response to a calling party below a first specified attestation level entering a random string of DTMF digits;
playing a no solicitation announcement to a calling party below a second specified attestation level and disconnecting the call; or
disconnecting the call without any announcement for a calling party below a third specified attestation level.

7. The method of claim 3, wherein the first network and the second network are the same network.

8. The method of claim 2, further comprising:
in response to receiving the reply message from the media server, propagating, with the no solicitation application server, the response back through the first and second call servers to the calling party; and
enabling a path, with the first gateway device, between the calling party and the media server, prior to playing the prompt to the calling party.

9. The method of claim 2, wherein performing the one or more tasks comprises at least one of entering a first series of numbers or speaking a first series of words, wherein the received response comprises at least one of a second series of entered numbers or a second series of spoken words, wherein verifying the response comprises comparing, with the no solicitation application server, the second series of entered numbers with the first series of numbers or the second series of spoken words with the first series of words.

10. The method of claim 8, wherein the first series of numbers comprises a random string of dual tone multi frequency ("DTMF") digits.

11. The method of claim 2, wherein establishing the connected call between the calling party and the called party comprises:
directing, with the no solicitation application server, the STI-VS to connect the call;
sending, with the STI-VS, a validated response to the second call server, along with an attestation level associated with the called party;
sending, with the second call server, a call setup message to a second gateway device;
sending, with a second gateway device, a setup message to the called party;
propagating, with the second gateway device, a backward message via the first and second call servers and via the first gateway device, the backward message containing information regarding a media path to be set up; and
establishing the connected call between the calling party and the called party, while clearing a media path between the first gateway device and the media server.

12. The method of claim 2, wherein at least one of the first gateway device, the first call server, the second call server, the STI-VS, or the no solicitation application server is disposed within a voice over Internet protocol ("VoIP").

13. The method of claim 2, wherein the called party is provided with options to set a preferred level of treatment for the no solicitation application server to implement in response to receiving the verified call setup message, wherein the options comprise at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls.

14. A system, comprising:
a first gateway device, the first gateway device comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the first gateway device to:
receive, from a calling party, a request to connect a call with a called party, the request including a called number associated with the called party; and
send a call setup request to a first call server in a first network;
the first call server, the first call server comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the first call server to:
receive the call setup request; and
in response to receiving the call setup request, send a call setup message to a second call server in a second network;
the second call server, the second call server comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes the second call server to:
receive the call setup message; and
in response to receiving the call setup message, send a verification request to a secure telephone identity ("STI") verification server ("VS");
the STI-VS, the STI-VS comprising:
at least one fourth processor; and
a fourth non-transitory computer readable medium communicatively coupled to the at least one fourth processor, the fourth non-transitory computer readable medium having stored thereon computer software comprising a fourth set of instructions that, when executed by the at least one fourth processor, causes the STI-VS to:
receive the verification request;
in response to receiving the verification request, verify the call setup message; and
send the verified call setup message to a no solicitation application server;

the no solicitation application server, the no solicitation application server comprising:
    at least one fifth processor; and
    a fifth non-transitory computer readable medium communicatively coupled to the at least one fifth processor, the fifth non-transitory computer readable medium having stored thereon computer software comprising a fifth set of instructions that, when executed by the at least one fifth processor, causes the no solicitation application server to:
        receive the verified call setup; and
        in response to receiving the verified call setup, instruct a media server to connect to the first gateway device and to play a no solicitation message requesting a response from the calling party;
the media server, the media server comprising:
    at least one sixth processor; and
    a sixth non-transitory computer readable medium communicatively coupled to the at least one sixth processor, the sixth non-transitory computer readable medium having stored thereon computer software comprising a sixth set of instructions that, when executed by the at least one sixth processor, causes the media server to:
        return a reply message to the no solicitation application server indicating a connection point for a voice media path to the calling party;
        play a prompt to the calling party, the prompt instructing the calling party to respond by performing one or more tasks;
        receive a response from the calling party in accordance with at least one of the one or more tasks; and
        return the response to the no solicitation application server;
wherein the fifth set of instructions, when executed by the at least one fifth processor, further causes the no solicitation application server to:
    verify whether the response is an appropriate response in accordance with at least one of the one or more tasks;
    based on a determination that the response has been verified to be an appropriate response, establish a connected call between the calling party and the called party; and
    based on a determination that the response is not an appropriate response, perform one of:
        disconnecting the call; or
        forwarding the call to a voicemail server to play a voicemail message to the calling party in accordance with preferences of the called party, prior to disconnecting the call.

15. The system of claim 14, wherein the fifth set of instructions, when executed by the at least one fifth processor, further causes the no solicitation application server to:
    apply one of various treatment options in response to receiving the verified call setup message, wherein the various treatment options comprises at least one of:
        connecting the call to the called party without any treatment for a calling party that has been whitelisted;
        connecting the call to the called party in response to a calling party below a first specified attestation level entering a random string of DTMF digits;
        playing a no solicitation announcement to a calling party below a second specified attestation level and disconnecting the call; or
        disconnecting the call without any announcement for a calling party below a third specified attestation level.

16. The system of claim 14, wherein performing the one or more tasks comprises at least one of entering a first series of numbers or speaking a first series of words, wherein the received response comprises at least one of a second series of entered numbers or a second series of spoken words, wherein verifying the response comprises comparing, with the no solicitation application server, the second series of entered numbers with the first series of numbers or the second series of spoken words with the first series of words.

17. The system of claim 14, wherein the first series of numbers comprises a random string of dual tone multi frequency ("DTMF") digits.

18. The system of claim 14, wherein establishing the connected call between the calling party and the called party comprises:
    directing, with the no solicitation application server, the STI-VS to connect the call;
    sending, with the STI-VS, a validated response to the second call server, along with an attestation level associated with the called party;
    sending, with the second call server, a call setup message to a second gateway device;
    sending, with a second gateway device, a setup message to the called party;
    propagating, with the second gateway device, a backward message via the first and second call servers and via the first gateway device, the backward message containing information regarding a media path to be set up; and
    establishing the connected call between the calling party and the called party, while clearing a media path between the first gateway device and the media server.

19. The system of claim 14, wherein at least one of the first gateway device, the first call server, the second call server, the STI-VS, or the no solicitation application server is disposed within a voice over Internet protocol ("VoIP").

20. The system of claim 14, wherein the called party is provided with options to set a preferred level of treatment for the no solicitation application server to implement in response to receiving the verified call setup message, wherein the options comprise at least one of allowing all calls to connect regardless of attestation level of the calling party, blocking all calls regardless of attestation level of the calling party, connecting all calls at the highest attestation level and applying preestablished treatment options for calls below the highest attestation level, or applying preestablished treatment options for calls below a selected attestation level below the highest attestation level and connecting other calls.

* * * * *